US012563009B2

(12) United States Patent
Liu

(10) Patent No.: US 12,563,009 B2
(45) Date of Patent: Feb. 24, 2026

(54) VIRTUAL PRIVATE CLOUD COMMUNICATION AND CONFIGURATION METHOD, AND RELATED APPARATUS

(71) Applicant: Huawei Cloud Computing Technologies Co., Ltd., Guizhou (CN)

(72) Inventor: Haixia Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 69 days.

(21) Appl. No.: 17/855,531

(22) Filed: Jun. 30, 2022

(65) Prior Publication Data

US 2022/0337545 A1 Oct. 20, 2022

Related U.S. Application Data

(63) Continuation of application No. PCT/CN2020/113379, filed on Sep. 4, 2020.

(30) Foreign Application Priority Data

Dec. 31, 2019 (CN) ......................... 201911424858.X

(51) Int. Cl.
H04L 61/2521 (2022.01)
H04L 45/74 (2022.01)
(52) U.S. Cl.
CPC .......... H04L 61/2528 (2013.01); H04L 45/74 (2013.01)
(58) Field of Classification Search
CPC ............................ H04L 45/74; H04L 61/2528
(Continued)

(56) References Cited

U.S. PATENT DOCUMENTS 9,992,086 B1    6/2018 Mizik et al.
11,113,046 B1 *  9/2021 Bowen ................... G06F 9/485
(Continued)

FOREIGN PATENT DOCUMENTS

CN    105591955 A    5/2016
CN    106559511 A    4/2017
(Continued)

OTHER PUBLICATIONS

On Dynamic Control Parameter Configuration Mechanism for Inter- and Intra-VPN Fairness Control Mechanism O. Honda; H. Ohsaki; M. Imase; J. Murayama; K. Matsuda 6th Asia-Pacific Symposium on Information and Telecommunication Technologies Year: 2005 | Conference Paper | Publisher: IEEE (Year: 2005).*

(Continued)

*Primary Examiner* — Jeffrey R Swearingen

(57) ABSTRACT

A method for configuring virtual private cloud (VPC) communication between a first and second VPC is provided. The first and second VPCs having a same private network address segment. The method includes binding a first VPC private network address with a first address, the first address belonging to the third VPC private network address segment; binding a second VPC private network address with a second address, the second address belonging to the third VPC private network address segment, the first address being different from the second address; configuring a packet source address to be the first address, the packet being sent by the first VPC and destined for the second VPC, using the first address, and configuring a packet destination address to be the second address. A third VPC private network address segment is different from the private network address segment of the first and second VPC.

10 Claims, 20 Drawing Sheets

(58) Field of Classification Search
USPC .......................................................... 709/245
See application file for complete search history.

(56) References Cited

U.S. PATENT DOCUMENTS

| | | | | |
|---|---|---|---|---|
| 11,119,739 B1 * | 9/2021 | Allen | .................. | H04L 63/0263 |
| 11,206,207 B1 * | 12/2021 | Deb | ........................ | H04L 12/46 |
| 11,240,203 B1 * | 2/2022 | Eyada | ..................... | H04L 63/20 |
| 11,252,126 B1 * | 2/2022 | Thunga | .................. | H04L 45/48 |
| 11,258,635 B2 * | 2/2022 | Han | .................... | G06F 9/45558 |
| 11,374,794 B2 * | 6/2022 | Hira | ........................ | H04L 45/72 |
| 2003/0145104 A1 | 7/2003 | Boden et al. | | |
| 2011/0110377 A1 * | 5/2011 | Alkhatib | ............ | H04L 61/2503 |
| | | | | 370/395.53 |
| 2013/0110993 A1 * | 5/2013 | Liu | .................... | H04L 12/4641 |
| | | | | 709/220 |
| 2013/0185446 A1 * | 7/2013 | Zeng | .................. | H04L 12/4633 |
| | | | | 709/228 |
| 2014/0334495 A1 * | 11/2014 | Stubberfield | ......... | H04L 49/354 |
| | | | | 370/401 |
| 2015/0188888 A1 | 7/2015 | Kang et al. | | |
| 2016/0112307 A1 * | 4/2016 | Shen | .................... | H04L 45/745 |
| | | | | 370/254 |

| | | | | |
|---|---|---|---|---|
| 2017/0353351 A1 | 12/2017 | Cheng et al. | | |
| 2018/0014340 A1 * | 1/2018 | Hill | ........................ | H04W 76/12 |
| 2018/0287996 A1 | 10/2018 | Tripathy et al. | | |
| 2019/0109729 A1 | 4/2019 | De Luca | | |
| 2020/0067734 A1 * | 2/2020 | Hira | ........................ | H04L 45/72 |
| 2020/0153736 A1 * | 5/2020 | Liebherr | ................ | H04L 67/63 |

FOREIGN PATENT DOCUMENTS

| | | | | |
|---|---|---|---|---|
| CN | 106789367 A | 5/2017 | | |
| CN | 108429680 A | 8/2018 | | |
| CN | 108833251 A | 11/2018 | | |
| CN | 109361764 A | 2/2019 | | |
| CN | 109450905 A | 3/2019 | | |
| CN | 109561171 A | 4/2019 | | |
| EP | 2584743 A1 | 4/2013 | | |
| EP | 3264690 A1 * | 1/2018 | .......... | H04L 12/462 |
| EP | 3382999 A1 | 10/2018 | | |

OTHER PUBLICATIONS

Sherry Wei, Using NAT to Solve Overlapping Network Addresses Issues in AWS, Medium [online], Apr. 28, 2019, [Date Searched: Nov. 6, 2023], total 7 pages.

* cited by examiner

S401
Create a gateway 1 in a VPC 1

S402
Configure a packet processing rule of the gateway 1

S403
Configure a routing rule of the VPC 1

S404
Create a gateway 2 in a VPC 2

S405
Configure a packet processing rule of the gateway 2

S406
Configure a routing rule of the VPC 2

S407
Configure a routing rule of a VPC 3

400

Settings interface 1 of a VPC 1

Create a gateway

Gateway name: | Gateway 1

VPC in which the gateway is located: | VPC 1

VPC to which the gateway is to connect: | VPC 3

Private network address of the VPC to which the gateway is to connect: | 10.0.0.9

Confirm    Cancel

FIG. 5A

Settings interface 2 of a VPC 1

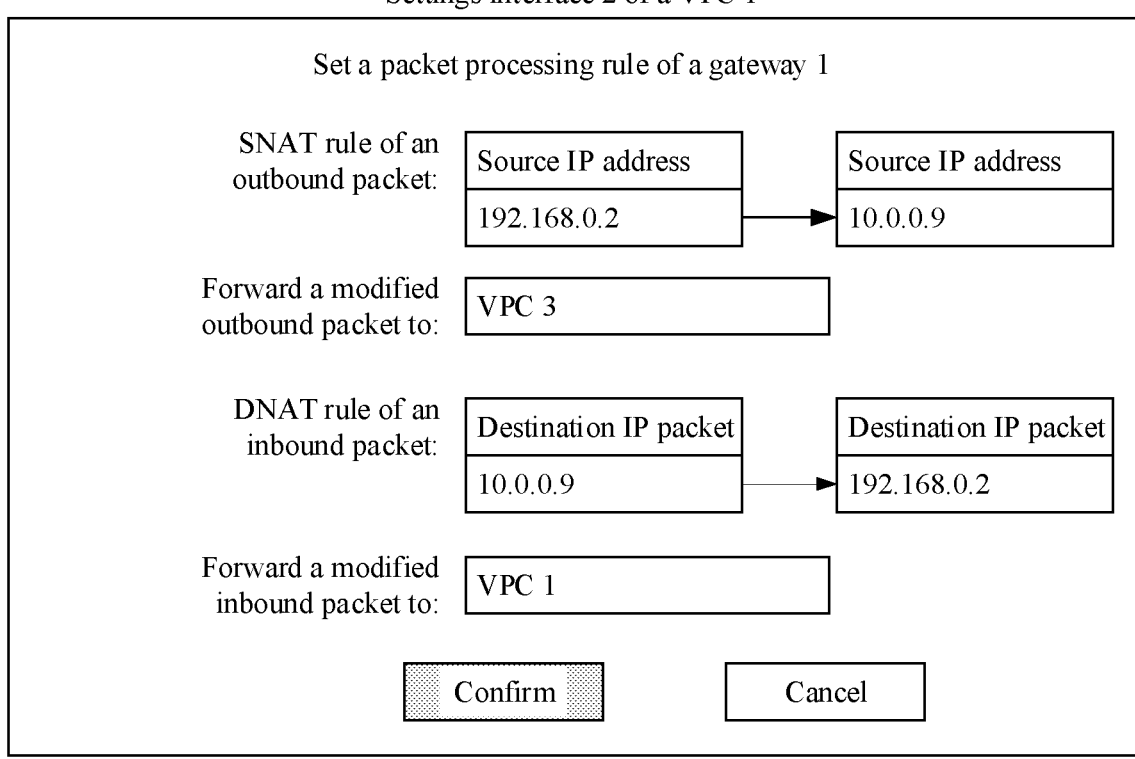

Set a packet processing rule of a gateway 1

SNAT rule of an outbound packet:

| Source IP address | Source IP address |
| 192.168.0.2 | 10.0.0.9 |

Forward a modified outbound packet to: | VPC 3

DNAT rule of an inbound packet:

| Destination IP packet | Destination IP packet |
| 10.0.0.9 | 192.168.0.2 |

Forward a modified inbound packet to: | VPC 1

Confirm    Cancel

FIG. 5B

Settings Interface 3 of a VPC 1

Set a routing rule of the VPC 1

| Destination IP address | Next-hop |
|---|---|
| 10.0.0.10 | Gateway 1 |
| 192.168.0.2 | Subnet 1 |

Confirm          Cancel

FIG. 5C

Settings interface 1 of a VPC 2

Create a gateway

Gateway name:  Gateway 2

VPC in which the gateway is located:  VPC 2

External VPC to which the gateway is to connect:  VPC 3

Private network address of the external VPC to which the gateway is to connect:  10.0.0.10

Confirm          Cancel

FIG. 5D

Settings interface 2 of a VPC 2

Settings interface 3 of a VPC 2

Settings interface of a VPC 3

CONT. FROM

CONT. FROM

CONT. FROM

6. Modify a destination IP address of the IP packet 1 according to a packet processing rule 3 and send a modified IP packet 1

7. Forward the IP packet 1 according to a routing rule 4

8. Forward the IP packet 1

9. Construct and send an IP packet 2

10. Forward the IP packet 2

11. Forward the IP packet 2 according to a routing rule 3

TO

TO

TO

VIRTUAL PRIVATE CLOUD COMMUNICATION AND CONFIGURATION METHOD, AND RELATED APPARATUS

CROSS-REFERENCE TO RELATED APPLICATIONS

This application is a continuation of International Application No. PCT/CN2020/113379, filed on Sep. 4, 2020, which claims priority to Chinese Patent Application No. 201911424858.X, filed on Dec. 31, 2019. The disclosures of the aforementioned applications are hereby incorporated by reference in their entireties.

TECHNICAL FIELD

This application relates to the field of cloud technologies, and in particular, to a virtual private cloud communication and configuration method and a related apparatus.

BACKGROUND

With development of cloud technologies, communication between two or more virtual private clouds (VPCs) is required. However, due to reasons such as private network address planning, if private network addresses of VPCs that need to communicate with each other overlap, the VPCs cannot communicate with each other.

SUMMARY

To resolve a problem in the conventional technology, embodiments of this disclosure provide a virtual private cloud communication and configuration method and a related apparatus, to effectively resolve a technical problem that VPCs on a cloud cannot communicate with each other due to overlapping private network addresses.

According to a first aspect, this application provides a method for configuring virtual private cloud VPC communication. In the method, a first virtual private cloud VPC and a second VPC that have a same private network address segment communicate with each other by using a third VPC. A private network address segment of the third VPC is different from the private network address segment of the first VPC and the private network address segment of the second VPC. The method includes the following steps: binding a private network address in the first VPC with a first address, where the first address is an address that belongs to the private network address segment of the third VPC; binding a private network address in the second VPC with a second address, where the second address is an address that belongs to the private network address segment of the third VPC, and the first address is different from the second address; configuring a source address of a packet sent by the first VPC to the second VPC, as the first address; and configuring a destination address the packet sent by the first VPC to the second VPC, as the second address.

Through bridging of the third VPC, the first VPC accesses the second VPC by accessing the second address bound with the second VPC, and the second VPC accesses the first VPC by accessing the first address bound with the first VPC. In this way, communication between the first VPC and the second VPC can be implemented when the private network address segment of the first VPC overlaps with the private network address segment of the second VPC.

According to an embodiment of the first aspect, the configuration method further includes a step of configuring a routing rule on the third VPC. The routing rule on the third VPC includes: forwarding a packet whose destination address is the first address to the first VPC, and forwarding a packet whose destination address is the second address to the second VPC.

The routing rule is configured, so that the third VPC can forward a packet between the first VPC and the second VPC. In this way, bridging is implemented.

According to an embodiment of the first aspect, the configuration method may further include the following steps: configuring a first gateway on the first VPC, and configuring a second gateway on the second VPC, where a private network address of the first gateway is configured as the first address, and a private network address of the second gateway is configured as the second address; configuring a first packet processing rule on the first gateway, where the first packet processing rule includes: converting a source address of an outbound packet from the address in the first VPC into the first address, and converting a destination address of an inbound packet from the first address into the address in the first VPC; and configuring a second packet processing rule on the second gateway, where the second packet processing rule includes: converting a source address of the outbound packet from the address in the second VPC into the second address, and converting a destination address of the inbound packet from the second address into the address in the second VPC.

The packet processing rules are configured, so that the first gateway binds the address in the first VPC with the first address, and the second gateway binds the address in the second VPC with the second address. In this way, the first VPC accesses the second VPC by accessing the second address, and the second VPC accesses the first VPC by accessing the first address.

According to an embodiment of the first aspect, the configuration method further includes a step of configuring a routing rule. The routing rule is configured on a router of the first VPC, and the routing rule on the router of the first VPC includes: forwarding the packet whose destination address is the second address to the first gateway, and forwarding a packet whose destination address is the address in the first VPC to a subnet of the first VPC. A routing rule is configured on a router of the second VPC, and the routing rule on the router of the second VPC includes: forwarding the packet whose destination address is the first address to the second gateway, and forwarding a packet whose destination address is the address in the second VPC to the subnet of the first VPC.

The routing rules are configured, so that the router of the first VPC can forward the packet between the first gateway and the subnet of the first VPC, and the router of the second VPC can forward the packet between the second gateway and a subnet of the second VPC.

According to an embodiment of the first aspect, the address in the first VPC includes an address for remotely accessing a subnet of a data center on premise center corresponding to the first VPC.

According to an embodiment of the first aspect, the address in the first VPC includes an address in the subnet of the first VPC.

According to a second aspect, this application provides a method for configuring virtual private cloud VPC communication. The method is used for a first virtual private cloud VPC and a second VPC that have a same private network address segment to communicate with each other by using a third VPC, and a private network address segment of the third VPC is different from the private network address segment of the first VPC and the private network address segment of the second VPC. The method includes the following steps: configuring a first gateway on the first VPC, and configuring a second gateway on the second VPC, where a first address is configured for the first gateway, a second address is configured for the second gateway, the first address and the second address belong to the private network address segment of the third VPC, and the first address is different from the second address; configuring a first packet processing rule on the first gateway, and configuring a second packet processing rule on the second gateway, where the first packet processing rule includes: converting a source address of an outbound packet from an address in the first VPC into the first address, and converting a destination address of an inbound packet from the first address into the address in the first VPC; and the second packet processing rule includes: converting a source address of the outbound packet from an address in the second VPC into the second address, and converting a destination address of the inbound packet from the second address into the address in the second VPC; and configuring a first routing rule on a router of the first VPC, configuring a second routing rule on a router of the second VPC, and configuring a third routing rule on a router of the third VPC, where the first routing rule includes: routing a packet whose destination address is the second address to the first gateway; the second routing rule includes: routing a packet whose destination address is the first address to the second gateway; and the third routing rule includes: routing the packet whose destination address is the first address to the first gateway in the first VPC, and routing the packet whose destination address is the second address to the second gateway in the second VPC.

Through bridging of the third VPC, the first VPC accesses the second VPC by accessing the second address bound with the second VPC, and the second VPC accesses the first VPC by accessing the first address bound with the first VPC. In this way, communication between the first VPC and the second VPC can be implemented when the private network address segment of the first VPC overlaps with the private network address segment of the second VPC.

According to an embodiment of the second aspect, the method further includes the following steps: configuring a connection relationship between the first VPC and the third VPC, and configuring a connection relationship between the second VPC and the third VPC.

The first gateway in the first VPC may be configured to connect to the router of the third VPC, and the second gateway in the second VPC may be configured to connect to the router of the third VPC, so that the first VPC and the second VPC are separately connected to the third VPC. In addition, the third VPC performs forwarding on the first VPC by using the first address bound with the first VPC, and performs forwarding on the second VPC by using the second address bound with the second VPC.

According to a third aspect, this application provides a virtual private cloud VPC communication method. The method is used for a first virtual private cloud VPC and a second VPC that have a same private network address segment to communicate with each other by using a third VPC. A private network address segment of the third VPC is different from the private network address segment of the first VPC and the private network address segment of the second VPC. The method includes the following steps: The first VPC sends a packet, where a source address of the packet is a first address, a destination address of the packet is a second address, both the first address and the second address are addresses that belong to the private network address segment of the third VPC, a private network address in the first VPC is bound with the first address, and a private network address in the second VPC is bound with the second address. The third VPC receives the packet, and forwards the packet to the second VPC according to a preset routing rule, where a routing rule of the third VPC includes: forwarding a packet whose destination address is the second address to the second VPC.

Through bridging of the third VPC, the first VPC accesses the second VPC by accessing the second address bound with the second VPC, and the second VPC accesses the first VPC by accessing the first address bound with the first VPC. In this way, communication between the first VPC and the second VPC can be implemented when the private network address segment of the first VPC overlaps with the private network address segment of the second VPC.

According to an embodiment of the third aspect, the routing rule further includes: forwarding a packet whose destination address is the first address to the first VPC. In this case, the method further includes the following steps: The second VPC sends a response packet, where a source address of the response packet is the second address, and a destination address of the response packet is the first address. The third VPC receives the response packet, and forwards the response packet to the first VPC according to the routing rule.

The routing rules are configured, so that a reply packet fed back by the second VPC can be forwarded to the first VPC by using the third VPC, to make a reply.

According to a fourth aspect, this application provides a virtual private cloud VPC communication method. A first VPC communicates with a second VPC by using a third VPC, the first VPC and the second VPC have a same private network address segment, and a private network address segment of the third VPC is different from the private network address segment of the first VPC and the private network address segment of the second VPC. A first gateway is configured on the first VPC, a second gateway is configured on the second VPC, a first address is configured for the first gateway, and a second address is configured for the second gateway. Both the first address and the second address belong to the private network address segment of the third VPC, and the first address is different from the second address. The method includes the following steps: A router of the first VPC receives a packet sent by a first device, where a source address of the packet is a private network address of the first device, and a destination address of the packet is the second address. The router of the first VPC forwards the packet to the first gateway according to a first routing rule. The first gateway modifies the source address of the packet to the first address, and forwards a modified packet to a router of the third VPC. A third routing rule is configured on the router of the third VPC. The first routing rule is that a packet whose destination address belongs to the private network address segment of the third VPC needs to be forwarded to the first gateway. The third routing rule is that a packet whose destination address is the second address needs to be forwarded to the second gateway in the second VPC.

Through bridging of the third VPC, the first VPC accesses the second VPC by accessing the second address bound with the second VPC, and the second VPC accesses the first VPC by accessing the first address bound with the first VPC. In this way, communication between the first VPC and the second VPC can be implemented when the private network address segment of the first VPC overlaps with the private network address segment of the second VPC.

In an embodiment of the fourth aspect, the first device may be a first virtual machine in a first subnet of the first VPC, or may be a physical machine or a virtual machine in a second subnet of a first data center on premise connected to the first VPC by using a remote communication tunnel. A second device may be a second virtual machine in a third subnet of the second VPC, or may be a physical machine or a virtual machine in a fourth subnet of a second data center on premise connected to the second VPC by using a remote communication tunnel.

In an embodiment of the fourth aspect, the method further includes the following steps: The second gateway receives a packet forwarded by the router of the third VPC, modifies a destination address of the received packet to an address of the second device, and sends a modified packet to a router of the second VPC. The router of the second VPC forwards, according to a second routing rule, the received packet to a subnet in which the second device is located. The second routing rule is that the packet whose destination address belongs to the second address needs to be forwarded to the subnet in which the second device is located.

The packet is modified and forwarded by the second gateway; after being forwarded by the router of the second VPC, the packet may arrive at the subnet in which the second device is located. In this way, the second device can receive the packet.

According to a fifth aspect, embodiments of the present disclosure provide a virtual private cloud VPC communication configuration apparatus. A first virtual private cloud VPC and a second VPC that have a same private network address segment communicate with each other by using a third VPC. A private network address segment of the third VPC is different from the private network address segment of the first VPC and the private network address segment of the second VPC. The apparatus includes the following modules: an address binding module, configured to: bind a private network address in the first VPC with a first address, where the first address is an address that belongs to the private network address segment of the third VPC; and bind a private network address in the second VPC with a second address, where the second address is an address that belongs to the private network address segment of the third VPC, and the first address is different from the second address; and an address configuration module, configured to: configure a source address of a packet sent by the first VPC to the second VPC, as the first address; configure a destination address of the packet sent by the first VPC to the second VPC, as the second address; configure a source address of a packet sent by the second VPC to the first VPC, as the second address; and configure a destination address of the packet sent by the second VPC to the first VPC, as the first address.

The fifth aspect or any implementation of the fifth aspect is an apparatus implementation corresponding to the first aspect or any implementation of the first aspect. Descriptions of the first aspect or any implementation of the first aspect are applicable to the fifth aspect or any implementation of the fifth aspect. Details are not described herein again.

According to a sixth aspect, this application provides a virtual private cloud VPC communication configuration apparatus. A first virtual private cloud VPC and a second VPC that have a same private network address segment communicate with each other by using a third VPC, and a private network address segment of the third VPC is different from the private network address segment of the first VPC and the private network address segment of the second VPC. The apparatus includes: a gateway configuration module, configured to configure a first gateway on the first VPC, and configure a second gateway on the second VPC; an address configuration module, configured to: configure a first address for the first gateway; and configure a second address for the second gateway, where the first address and the second address belong to the private network address segment of the third VPC, and the first address is different from the second address; an address binding module, configured to: configure a first packet processing rule on the first gateway; and configure a second packet processing rule on the second gateway, where the first packet processing rule includes: converting a source address of an outbound packet from an address in the first VPC into the first address, sending a modified outbound packet to a router of the third VPC, converting a destination address of an inbound packet from the first address into the address in the first VPC, and sending a modified inbound packet to a router of the first VPC; and the second packet processing rule includes: converting a source address of the outbound packet from an address in the second VPC into the second address, sending a modified outbound packet to the router of the third VPC, converting a destination address of the inbound packet from the second address into the address in the second VPC, and sending a modified inbound packet to a router of the second VPC; and a routing rule configuration module, configured to: configure a first routing rule on the router of the first VPC, configure a second routing rule on the router of the second VPC, and configure a third routing rule on the router of the third VPC, where the first routing rule includes: routing a packet whose destination address is the second address to the first gateway; the second routing rule includes: routing a packet whose destination address is the first address to the second gateway; and the third routing rule includes: routing the packet whose destination address is the first address to the first gateway in the first VPC, and routing the packet whose destination address is the second address to the second gateway in the second VPC.

The sixth aspect or any implementation of the sixth aspect is an apparatus implementation corresponding to the second aspect or any implementation of the second aspect. Descriptions of the second aspect or any implementation of the second aspect are applicable to the sixth aspect or any implementation of the sixth aspect. Details are not described herein again.

According to a seventh aspect, this application provides a virtual private cloud VPC communications system, including a first virtual private cloud VPC, a second VPC, and a third VPC. The first VPC and the second VPC have a same private network address segment, and the first VPC and the second VPC communicate with each other by using the third VPC. A private network address segment of the third VPC is different from the private network address segment of the first VPC and the private network address segment of the second VPC. The first VPC is configured to send a packet. A source address of the packet is a first address, a destination address of the packet is a second address, both the first address and the second address are addresses that belong to the private network address segment of the third VPC, a private network address in the first VPC is bound with the first address, and a private network address in the second VPC is bound with the second address. The third VPC is configured to: receive the packet, and forward the packet to the second VPC according to a preset routing rule. A routing rule of the third VPC includes: forwarding a packet whose destination address is the second address to the second VPC.

The seventh aspect or any implementation of the seventh aspect is a system implementation corresponding to the third aspect or any implementation of the third aspect. Descriptions of the third aspect or any implementation of the third aspect are applicable to the seventh aspect or any implementation of the seventh aspect. Details are not described herein again.

According to an eighth aspect, this application provides a virtual private cloud VPC communications system, including a first virtual private cloud VPC, a second VPC, and a third VPC. The first VPC communicates with the second VPC by using the third VPC, and the first VPC and the second VPC have a same private network address segment. A private network address segment of the third VPC is different from the private network address segment of the first VPC and the private network address segment of the second VPC. A first gateway is configured on the first VPC, a second gateway is configured on the second VPC, a first address is configured for the first gateway, and a second address is configured for the second gateway. Both the first address and the second address belong to the private network address segment of the third VPC, and the first address is different from the second address. A router of the first VPC is configured to receive a packet sent by a first device. A source address of the packet is a private network address of the first device, and a destination address of the packet is the second address. The router of the first VPC is further configured to forward the packet to the first gateway according to a first routing rule. The first gateway is configured to: modify the source address of the packet to the first address, and forward a modified packet to a router of the third VPC. A third routing rule is configured on the router of the third VPC. The first routing rule is that a packet whose destination address belongs to the private network address segment of the third VPC needs to be forwarded to the first gateway. The third routing rule is that a packet whose destination address is the second address needs to be forwarded to the second gateway in the second VPC.

The eighth aspect or any implementation of the eighth aspect is a system implementation corresponding to the fourth aspect or any implementation of the fourth aspect. Descriptions in the fourth aspect or any implementation of the fourth aspect are applicable to the eighth aspect or any implementation of the eighth aspect. Details are not described herein again.

According to a ninth aspect, this application provides a virtual private cloud VPC communications system, including a first virtual private cloud VPC, a second VPC, and a third VPC. The first VPC communicates with the second VPC by using the third VPC, and the first VPC and the second VPC have a same private network address segment. A private network address segment of the third VPC is different from the private network address segment of the first VPC and the private network address segment of the second VPC. A first gateway connected to the third VPC is configured on the first VPC, and a second gateway connected to the third VPC is configured on the second VPC. A first address is configured for the first gateway, and a second address is configured for the second gateway. Both the first address and the second address belong to the private network address segment of the third VPC, and the first address is different from the second address. A first virtual machine in a first subnet of the first VPC is configured to send a packet to a switch of the first subnet. A source address of the packet is a private network address of the first virtual machine in the first subnet, and a destination address of the packet is the second address. The switch of the first subnet is configured to send the packet to a router of the first VPC. The router of the first VPC is configured to: receive the packet, and forward the packet to the first gateway. The first gateway is configured to: receive the packet, modify the destination address of the packet to the first address, and send a modified packet to a router of the third VPC. The router of the third VPC is configured to: receive the packet, and forward the packet to the second gateway. The second gateway is configured to: receive the packet, modify the destination address of the received packet to a private network address, of a second virtual machine in a second subnet of the second VPC, in the second subnet, and send a modified packet to a router of the second VPC. The router of the second VPC is configured to: receive the packet, and forward the packet to a switch of the second subnet. The switch of the second subnet is configured to: receive the packet, and forward the packet to the second virtual machine.

According to a tenth aspect, this application provides a virtual private cloud VPC communications system, including a first virtual private cloud VPC, a second VPC, and a third VPC. The first VPC communicates with the second VPC by using the third VPC, and the first VPC and the second VPC have a same private network address segment, a private network address segment of the third VPC is different from the private network address segment of the first VPC and the private network address segment of the second VPC, a first remote connection gateway remotely connected to a first data center on premise and a first gateway connected to the third VPC are configured on the first VPC, a second remote connection gateway remotely connected to a second data center on premise and a second gateway connected to the third VPC are configured on the second VPC, a first address is configured for the first gateway, and a second address is configured for the second gateway, both the first address and the second address belong to the private network address segment of the third VPC, and the first address is different from the second address. The first remote connection gateway is configured to: receive a packet sent by a first device in a first subnet of the first data center on premise, and send the packet to a router of the first VPC. A source address of the packet is a private network address of the first device in the first subnet, and a destination address of the packet is the second address. The router of the first VPC is configured to: receive the packet, and forward the packet to the first gateway. The first gateway is configured to: receive the packet, modify the destination address of the packet to the first address, and forward a modified packet to a router of the third VPC. The router of the third VPC is configured to: receive the packet, and forward the packet to the second gateway. The second gateway is configured to: receive the packet, modify the destination address of the received packet to a private network address, of a second device in a second subnet of the second data center on premise, in the second subnet, and send a modified packet to a router of the second VPC. The router of the second VPC is configured to: receive the packet, and forward the packet to the second remote connection gateway. The second remote connection gateway is configured to receive the packet, and send the packet to the second device in the second subnet of the second data center on premise.

According to an eleventh aspect, this application provides a virtual private cloud VPC communications system, including a first virtual private cloud VPC, a second VPC, and a third VPC. The first VPC communicates with the second VPC by using the third VPC, and the first VPC and the second VPC have a same private network address segment, a private network address segment of the third VPC is different from the private network address segment of the first VPC and the private network address segment of the second VPC, a first gateway is configured on the first VPC, a second gateway is configured on the second VPC, a first address is configured for the first gateway, and a second address is configured for the second gateway. Both the first address and the second address belong to the private network address segment of the third VPC, a router of the first VPC and a router of the second VPC are separately connected to a router of the third VPC, and the first address is different from the second address. A first virtual machine in a first subnet of the first VPC is configured to send a packet to a switch of the first subnet. A source address of the packet is a private network address of the first virtual machine in the first subnet, and a destination address of the packet is the second address. The switch of the first subnet is configured to send the packet to the first gateway. The first gateway is configured to: modify the source address of the packet to the first address, and send a modified packet to the router of the first VPC. The router of the first VPC is configured to: receive the packet, and forward the packet to the router of the third VPC. The router of the third VPC is configured to: receive the packet, and forward the packet to the router of the second VPC. The router of the second VPC is configured to: receive the packet, and forward the packet to the second gateway. The second gateway is configured to: receive the packet, modify the destination address of the received packet to a private network address, of a second virtual machine in a second subnet of the second VPC, in the second subnet, and send a modified packet to a switch of the second subnet. The switch of the second subnet is configured to: receive the packet, and forward the packet to the second virtual machine.

According to a twelfth aspect, this application provides a computing device, including at least one memory and at least one processor. The at least one memory is configured to store a program instruction, and the at least one processor executes the program instruction, to perform the method for implementing the first aspect and embodiments of the first aspect.

According to a thirteenth aspect, this application provides a computing device, including at least one memory and at least one processor. The at least one memory is configured to store a program instruction, and the at least one processor executes the program instruction, to perform the method for implementing the second aspect and embodiments of the second aspect.

According to a fourteenth aspect, this application provides a non-transient readable storage medium. When the non-transient readable storage medium is executed by a computing device, the computing device performs the method provided in any one of the first aspect or the embodiments of the first aspect. The storage medium stores a program. The storage medium includes but is not limited to a volatile memory, for example, a random access memory or a non-volatile memory, for example, a flash memory, a hard disk drive (HDD), or a solid-state drive (SSD).

According to a fifteenth aspect, this application provides a non-transient readable storage medium. When the non-transient readable storage medium is executed by a computing device, the computing device performs the method provided in any one of the second aspect or the embodiments of the second aspect. The storage medium stores a program. The storage medium includes but is not limited to a volatile memory, for example, a random access memory or a non-volatile memory, for example, a flash memory, a hard disk drive (HDD for short), or a solid-state drive (SSD).

According to a sixteenth aspect, this application provides a computing device program product. The computing device program product includes a computer instruction. When the computer instruction is executed by a computing device, the computing device performs the method provided in any one of the first aspect or the embodiments of the first aspect. The computer program product may be a software installation package. When the method provided in any one of the first aspect or the embodiments of the first aspect needs to be used, the computer program product may be downloaded to and executed on the computing device.

According to a seventeenth aspect, this application provides another computing device program product. The computing device program product includes a computer instruction. When the computer instruction is executed by a computing device, the computing device performs the method provided in any one of the second aspect or the embodiments of the second aspect. The computer program product may be a software installation package. When the method provided in any one of the second aspect or the embodiments of the second aspect needs to be used, the computer program product may be downloaded to and executed on the computing device.

According to an eighteenth aspect, this application further provides a method for configuring virtual private cloud VPC communication. A first VPC and a second VPC that have a same private network address segment communicate with each other by using a third VPC, and a private network address segment of the third VPC is different from the private network address segment of the first VPC and the private network address segment of the second VPC. The method includes: providing a first configuration page for a user in the first VPC, where the first configuration page prompts the user in the first VPC to create a first gateway on the first VPC, and prompts the user in the first VPC to enter information about the third VPC to which the first gateway needs to be connected and a first address of the first gateway in the third VPC; providing a second configuration page for a user in the second VPC, where the second configuration page prompts the user in the second VPC to create a second gateway on the second VPC, and prompts the user in the second VPC to enter the information about the third VPC to which the second gateway needs to be connected and a second address of the second gateway in the third VPC; and the first address and the second address belong to the private network address segment of the third VPC, and the first address is different from the second address; creating the first gateway based on information about the first configuration page; and creating the second gateway based on information about the second configuration page.

According to an embodiment of the eighteenth aspect, the VPC communication configuration method further includes the following steps: configuring a first packet processing rule on the first gateway, and configuring a second packet processing rule on the second gateway, where the first packet processing rule includes: converting a source address of an outbound packet from an address in the first VPC into the first address, and converting a destination address of an inbound packet from the first address into the address in the first VPC; and the second packet processing rule includes: converting a source address of the outbound packet from an address in the second VPC into the second address, and converting a destination address of the inbound packet from the second address into the address in the second VPC; and configuring a first routing rule on a router of the first VPC, configuring a second routing rule on a router of the second VPC, and configuring a third routing rule on a router of the third VPC, where the first routing rule includes: routing a packet whose destination address is the second address to the first gateway; the second routing rule includes: routing a packet whose destination address is the first address to the second gateway; and the third routing rule includes: routing the packet whose destination address is the first address to the first gateway in the first VPC, and routing the packet whose destination address is the second address to the second gateway in the second VPC.

BRIEF DESCRIPTION OF DRAWINGS

FIG. 5a to FIG. 5g show VPC settings interfaces provided by a control platform;

DESCRIPTION OF EMBODIMENTS

Figure 1:
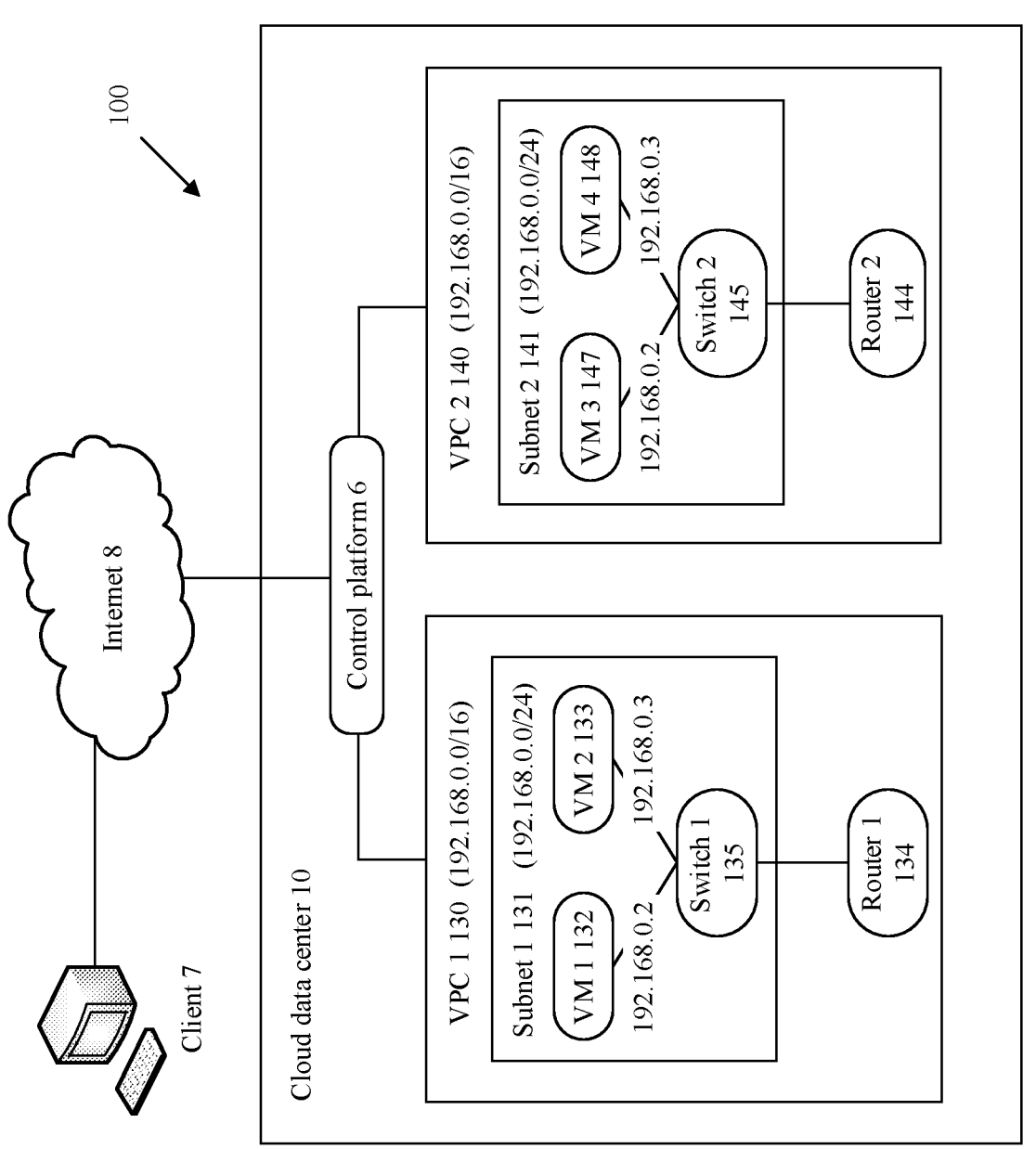
FIG. 1 is a diagram of a VPC communications system.

Terms used in the embodiments of the present disclosure are first explained.

A cloud data center is a data center that provides a public cloud service.

A data center on premise is a data center that provides a non-public cloud service. If the data center on premise provides an on-premise service, the data center on premise includes a plurality of physical machines. If the data center on premise provides a private cloud service, the data center on premise includes a plurality of virtual machines.

A public cloud service is infrastructure as a service (IaaS). The public cloud service means that infrastructure provided by a public cloud service provider is externally provided as a service on the internet. In this service model, a user does not need to build a data center. Instead, the user rents infrastructure, such as a server, a storage, and a network, for use. The public cloud service is implemented by providing a virtual environment (such as a virtual machine). A core attribute of the public cloud is that a plurality of users share cloud infrastructure and the users are isolated from each other.

A non-public cloud service provides infrastructure dedicated to a single user, for example, a private cloud service and an on-premise service.

A private cloud service is that a single user owns and can fully control infrastructure, such as a server, a storage, and a network. The private cloud service is implemented by providing a virtual environment (such as a virtual machine). A core attribute of the private cloud service is that the single user exclusively uses the infrastructure.

An on-premise service is that a single user locally builds infrastructure, such as a server, a storage, and a network. The user exclusively uses the infrastructure. The on-premise service is implemented by using a physical machine.

A private network address is an IP address that cannot be forwarded on the internet but can be forwarded only on a local area network. The private network address is prohibited from being used on the internet.

The private network address is a reserved IP address. The following table lists classification of private network addresses, a network segment, and a quantity of private network addresses.

| Classification of private network addresses | Network segment | Quantity of available private network addresses |
|---|---|---|
| Class A private network address | 192.168.0.0/16 | 65,532 |
| Class B private network address | 172.16.0.0/12 | 1,048,572 |
| Class C private network address | 10.0.0.0/8 | 16,777,212 |

A virtual private cloud (VPC) is configured on a public cloud, and the VPC is a virtual network of a user of a public cloud service in a cloud data center. Each VPC can separately form a network and is logically isolated from other VPCs. Therefore, private network address segments of subnets in different VPCs may be the same.

Each VPC has an independent tunnel number. Packets between virtual machines in a VPC have a same tunnel identifier and are sent to a physical network for transmission. Tunnel identifiers of virtual machines in the different VPCs are different, and the virtual machines are located on two different routing planes. Therefore, the virtual machines in the different VPCs cannot communicate with each other, naturally implementing logical isolation.

The tunnel identifier may be, for example, a virtual local area network identifier (VLAN ID) or a virtual network identifier (VNI).

FIG. 1 is a diagram of a VPC communications system 100. As shown in FIG. 1, the VPC communications system 100 includes a cloud data center 10 and a client 7. The client 7 accesses the cloud data center 10 via the internet 8.

FIG. 1 is a logical diagram of the cloud data center 10. The cloud data center 10 provides a VPC 1 130 and a VPC 2 140 to a public cloud user. The VPC 1 130 includes a router 1 134 and a subnet 1 131. A private network address segment of the VPC 1 130 is 192.168.0.0/16, and a private network address segment of the subnet 1 131 is 192.168.0.0/24. A virtual machine (VM) 1 132 and a VM 2 133 are configured in the subnet 1 131. A private network address of the VM 1 132 is 192.168.0.2, and a private network address of the VM 2 133 is 192.168.0.3. The VM 1 132 and the VM 2 133 are connected to a switch 1 135, and the router 1 134 is connected to the switch 1 135.

It should be noted that the private network address segment of the subnet 1 131 is a subset of the private network address segment of the VPC 1 130. In addition to the subnet 1 131, the VPC 1 130 may further include other subnets, such as a subnet whose private network address segment is 192.168.1.0/24, or a subnet whose private network address segment is 192.168.2.0/24. The router 1 134 is configured to forward a packet for communication between different subnets.

In addition, the VPC 2 140 includes a router 2 144 and a subnet 2 141. The private network address segment of the VPC 2 140 is 192.168.0.0/16, and a private network address segment of the subnet 2 141 is 192.168.0.0/24. A VM 3 147 and a VM 4 148 are configured in the subnet 2 141. A private network address of the VM 3 147 is 192.168.0.2, and a private network address of the VM 4 148 is 192.168.0.3. The VM 3 147 and the VM 4 148 are connected to a switch 2 145, and the router 2 144 is connected to the switch 2 145.

The subnet 1 131 and the subnet 2 141 have a same private network address segment. In other words, a private network address segment of the subnet 1 131 overlaps with a private network address segment of the subnet 2 141.

Similarly, the private network address segment of the subnet 2 141 is a subset of the private network address segment of the VPC 2 140. In addition to the subnet 2 141, the VPC 2 140 may further include other subnets, such as the subnet whose private network address segment is 192.168.1.0/24, or the subnet whose private network address segment is 192.168.2.0/24. The router 2 144 is configured to forward the packet for communication between different subnets.

The client 7 accesses a control platform 6 through the internet 8, and the control platform 6 provides a VPC configuration page. The client 7 accesses the VPC configuration interface through the internet 8, and enters configuration information of a VPC on the VPC configuration interface. The control platform 6 configures the VPC in the cloud data center 10 based on the configuration information. Each functional module in the VPC may be configured, for example, the VPC may be created or deleted, a virtual machine may be created or deleted in the VPCs, and a routing rule of a router of the VPC may be configured. The control platform 6 may perform full lifecycle management on the VPCs based on the configuration information. From a perspective of the client 7, the cloud data center 10 provides the VPC 1 130 and the VPC 2 140 that are logically isolated. The client 7 can log in to the VM 1 132 or the VM 2 133 of the VPC 1 130 using a remote desktop. The client 7 also can log in to the VM 3 147 and the VM 4 148 in the VPC 2 140. The VPC 1 130 and the VPC 2 140 are logically isolated and do not interfere with each other.

The client 7 is a terminal device, for example, a mobile phone with a network access function, a personal computer, a personal digital assistant, or a thin client. A user uses virtual machines in the cloud data center 10 by using the client 7.

As shown in FIG. 1, the VM 1 132 and the VM 2 133 are configured in the subnet 1 131 of the VPC 1 130, the private network address 192.168.0.2 is set for the VM 1 132 in the subnet 1 131 of the VPC 1 130, the private network address 192.168.0.3 is set for the VM 2 133 in the subnet 1 131 of the VPC 1 130, and the VM 1 132 communicates with the VM 2 133 by using the switch 1 135. The VM 3 147 and the VM 4 148 are configured in the subnet 2 141 of the VPC 2 140, the private network address 192.168.0.2 is set for the VM 3 147 in the subnet 2 141 of the VPC 2 140, the private network address 192.168.0.3 is set for the VM 4 148 in the subnet 2 141 of the VPC 2 140, and the VM 3 147 communicates with the VM 4 148 using the switch 2 145.

For example, the user uses the client 7 to log in to the VM 1 132, and enters an internet control message protocol (ICMP) command "ping 192.168.1.3" on the VM 1 132. The command is used to control the VM 1 132 to send an IP packet to the VM 2 133, to test whether the VM 1 132 and the VM 2 133 are interconnected. In this embodiment, because the VM 1 132 and the VM 2 133 are configured in the same VPC 1 130, the VM 1 132 obtains a reply from the VM 2 133.

However, as shown in FIG. 1, because the VPC 1 130 and the VPC 2 140 are logically isolated, the virtual machine in the VPC 1 130 cannot communicate with the virtual machine in the VPC 2 140. The client 7 logs in to the VM 1 132, and may enter an ICMP command "ping 192.168.0.3" on the VM 1 132. The command is used to test whether the VM 1 132 and the VM 4 148 are interconnected. In this embodiment, because the VM 1 132 and the VM 4 148 are set in different VPCs, the VM 1 132 does not obtain a reply from the VM 4 148.

In an enterprise cloud application scenario, due to a need of service isolation between departments, VPCs can be used to isolate services. For example, the VPC 1 130 belongs to a research and development department, and the VPC 2 140 belongs to a finance department. In the logical architecture shown in FIG. 1, VMs in the research and development department can communicate with each other, and VMs in the finance department can also communicate with each other. However, the VMs in the research and development department cannot communicate with the VMs in the finance department. VMs of different departments are configured in the different VPCs to effectively implement data isolation.

However, in a practical application, the VMs in the research and development department and the VMs in the finance department need to communicate with each other in some cases. For example, the VMs in the research and development department need to obtain financial data of the research and development department from the VMs in the finance department. If the VMs in the research and development department and the VMs in the finance department are isolated from each other, the financial data cannot be obtained from the VMs in the finance department.

Therefore, in some implementations, the router 1 134 and the router 2 144 are connected, so that the VPC 1 130 and the VPC 2 140 can communicate with each other. However, in the scenario shown in FIG. 1, the private network address segment of the subnet 1 131 overlaps with the private network address segment of the subnet 2 141. In this case, even if the router 1 134 and the router 2 144 are connected, the subnet 1 131 and the subnet 2 141 cannot communicate with each other. For example, the VM 1 132 communicates with the VM 3 147, the VM 1 132 constructs an IP packet whose source IP address and destination IP address are both 192.168.0.2. When the IP packet reaches the switch 1 135, the switch 1 135 intercepts the IP packet and sends the IP packet to the VM 1 132 based on the destination IP address of the IP packet, an operating system of the VM 1 132 directly intercepts the IP packet. In this case, the IP packet cannot reach the subnet 2 141.

Figure 2:
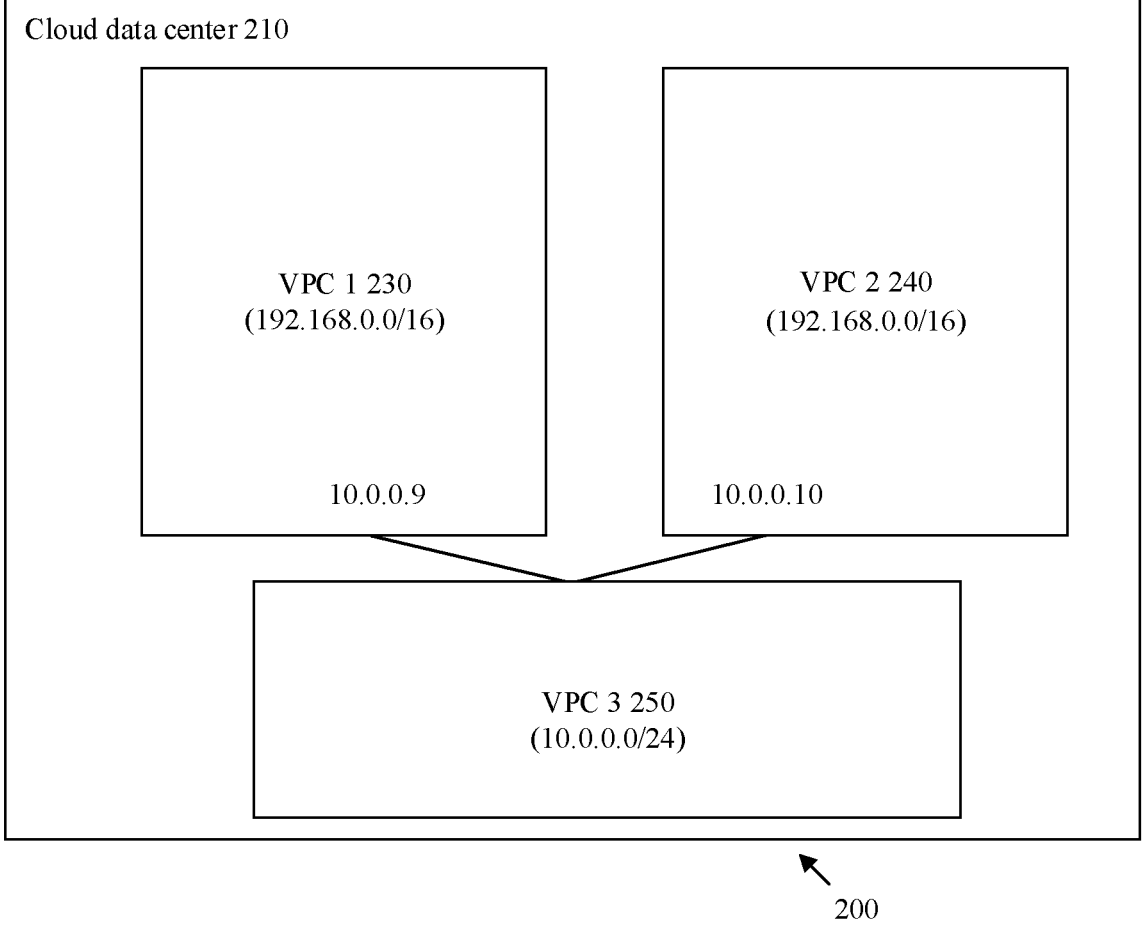
FIG. 2 is a diagram of a VPC communications system according to an embodiment of the present disclosure.

To resolve the foregoing technical problem, the embodiments of the present disclosure provide a VPC communications system. Referring to FIG. 2, FIG. 2 is a diagram of a VPC communications system 200 according to an embodiment of the present disclosure. As shown in FIG. 2, a VPC 1 230 and a VPC 2 240 that have a same private network address segment communicate with each other using a VPC 3 250. A private network address segment of the VPC 3 250 is different from the private network address segment of the VPC 1 230 and the private network address segment of the VPC 2 240. A private network address in the VPC 1 230 is bound with 10.0.0.9, and 10.0.0.9 is an address that belongs to the private network address segment of the VPC 3 250. A private network address in the VPC 2 240 is bound with 10.0.0.10, and 10.0.0.10 is the address that belongs to the private network address segment of the VPC 3 250. A source address of a packet sent by the VPC 1 230 to the VPC 2 240 is configured as 10.0.0.9, and a destination address of the packet sent by the VPC 1 230 to the VPC 2 240 is configured as 10.0.0.10. The packet is sent by the VPC 1 230 to the VPC 3 250, and forwarded by the VPC 3 250 to the VPC 2 240.

Through the bridging by the VPC 3 250, the VPC 1 230 can access the VPC 2 240 by accessing 10.0.0.10 that is bound with the VPC 2 240. In this way, communication between the VPC 1 230 and the VPC 2 240 may be implemented when the private network address segment of the VPC 1 230 overlaps with the private network address segment of the VPC 2 240.

Figure 3A:
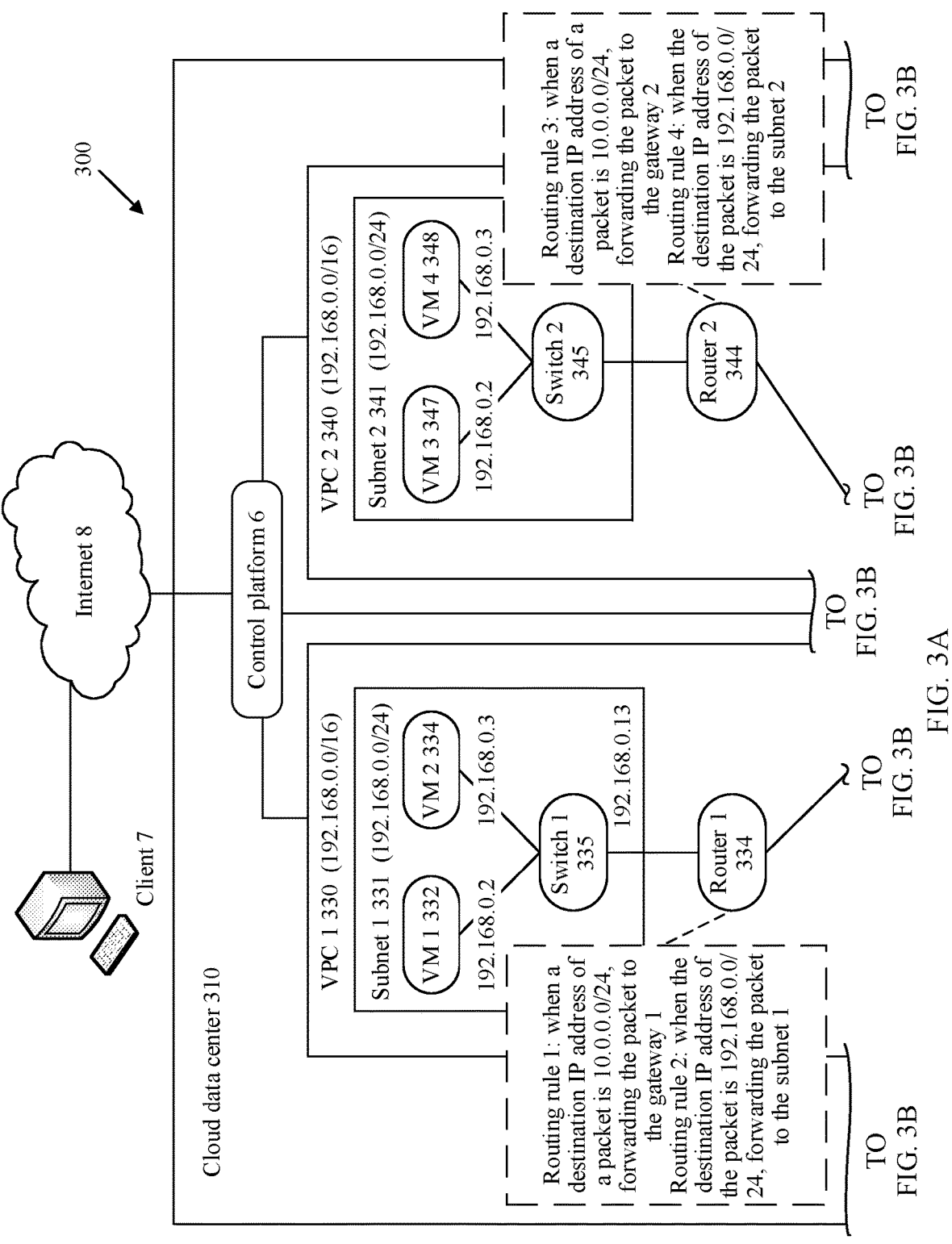
FIG. 3A and FIG. 3B are a diagram of a VPC communications system according to an embodiment of the present disclosure.
Figure 3B:
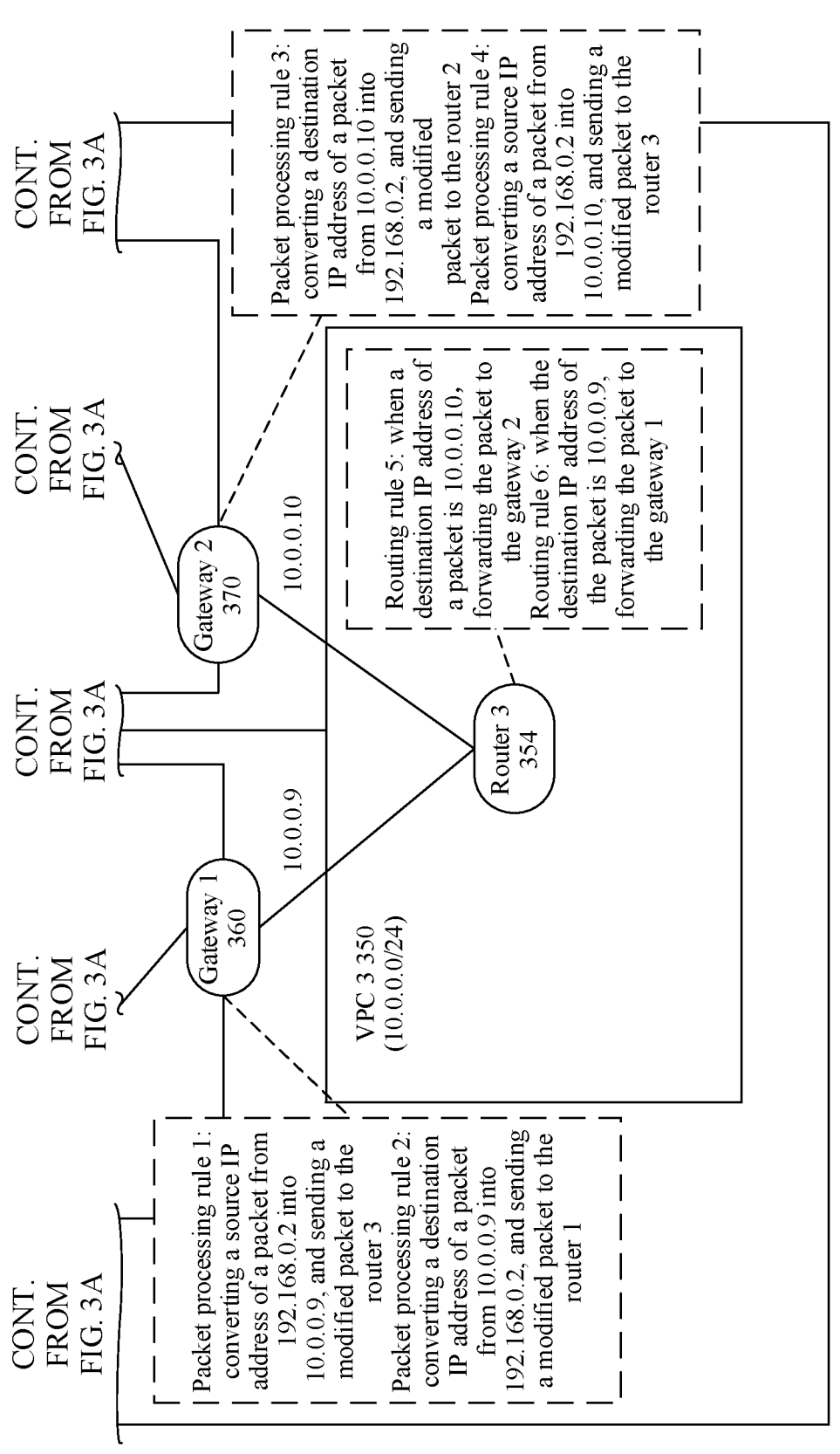

For further clear description, refer to FIG. 3A and FIG. 3B in the following. FIG. 3A and FIG. 3B are a diagram of a VPC communications system 300 according to an embodiment of the present disclosure. FIG. 3A and FIG. 3B are an implementation of FIG. 2. In this embodiment, a VPC 3 350 is configured between a VPC 1 330 and a VPC 2 340 by using a control platform 316, and a private network address segment that does not overlap a private network address of the VPC 1 330 and a private network address of the VPC 2 340 is set for the VPC 3 350. In addition, a gateway 1 360 connected to the VPC 3 350 is disposed in the VPC 1 330. A first private network address of the VPC 3 350 is set on the gateway 1 360. A gateway 2 370, connected to the VPC 3 350, is disposed in the VPC 2 340. A second private network address of the VPC 3 350 is set on the gateway 2 370. A VM 1 332 in the VPC 1 330 is bound with the gateway 1 360, and a VM 3 347 in the VPC 2 340 is bound with the gateway 2 370, by setting routing rules of routers of the VPC 1 330, the VPC 2 340, and the VPC 3 350 and packet processing rules of the gateway 1 360 and the gateway 2 370. In this way, the VM 1 332 communicates with the VM 3 347 by accessing the second private network address of the VPC 3 350, and the VM 3 347 communicates with the VM 1 332 by accessing the first private network address of the VPC 3 350.

The control platform 316 may perform the foregoing gateway creation and rule configuration in a cloud data center 310 based on configuration information, and the configuration information is entered by a client 7 into a VPC configuration interface provided by the control platform 316.

In another embodiment, the control platform 316 may also automatically generate the foregoing configuration information, and perform the foregoing configuration. Details are as Follows:

The control platform 316 may allocate a private network address 10.0.0.9 of the private network address segment (for example, 10.0.0.0/24) of the VPC 3 350 to the gateway 1 360 based on the configuration information, and allocate another private network address 10.0.0.10 of the private network address segment (for example, 10.0.0.0/24) of the VPC 3 350 to the gateway 2 370. In addition, the gateway 1 360 is configured to connect to a router 3 354 of the VPC 3 350, and the gateway 2 370 is configured to connect to the router 3 354 of the VPC 3. The control platform 316 separately configures the routers and the gateways.

A Router 1 334 is Provided with:

a routing rule 1: When a destination IP address of a packet received by the router 1 334 is the private network address segment 10.0.0.0/24 of the VPC 3 350, the router 1 334 forwards the IP packet to the gateway 1 360; and a routing rule 2: When the destination IP address of the packet received by the router 1 334 is a private network address segment 192.168.0.0/24 of a subnet 1 331, the router 1 334 forwards the packet to the subnet 1 331.

The Gateway 1 360 is Provided with:

a packet processing rule 1: When a source IP address of an outbound packet received by the gateway 1 360 is a private network address 192.168.0.2 of the VM 1 332 in the subnet 1 331, the gateway 1 360 converts 192.168.0.2 into the private network address 10.0.0.9 of the gateway 1 360 in the VPC 3 350, and sends a modified outbound packet to the router 3 354 of the VPC 3 350; and a packet processing rule 2: When a destination IP address of an inbound packet received by the gateway 1 360 is the private network address 10.0.0.9 of the gateway 1 360 in the VPC 3 350, the gateway 1 360 converts 10.0.0.9 into the private network address 192.168.0.2 of the VM 1 332 in the subnet 1 331, and sends a modified inbound packet to the router 1 334 of the VPC 1 330.

The outbound packet is a packet received by the gateway 1 360 from the router 1 334, and the inbound packet is a packet received by the gateway 1 360 from the router 3 354.

The Router 3 354 is Provided with:

a routing rule 5: When a destination IP address of a packet received by the router 3 354 is the private network address 10.0.0.10 of the gateway 2 370 in the VPC 3 350, the router 3 354 forwards the IP packet to the gateway 2 370; and a routing rule 6: When the destination IP address of the packet received by the router 3 354 is the private network address 10.0.0.9 of the gateway 1 360 in the VPC 3 350, the router 3 354 forwards the packet to the gateway 1 360.

The Gateway 2 370 is Provided with:

a packet processing rule 3: When a destination IP address of an inbound packet received by the gateway 2 370 is the private network address 10.0.0.10 of the gateway 2 370 in the VPC 3 350, the gateway 2 370 converts 10.0.0.10 into a private network address 192.168.0.2 of the VM 3 347 in a subnet 2 341, and sends a modified inbound packet to a router 2 344; and a packet processing rule 4: When a source IP address of an outbound packet received by the gateway 2 370 is the private network address 192.168.0.2 of the VM 3 347 in the subnet 2 341, the gateway 2 370 converts 192.168.0.2 into the private network address 10.0.0.10 of the gateway 2 370 of the VPC 3 350.

The outbound packet is a packet received by the gateway 2 370 from the router 2 344, and the inbound packet is a packet received by the gateway 2 370 from the router 3 354.

A Router 2 344 is Provided with:

a routing rule 3: When a destination IP address of a packet received by the router 2 344 is the private network address segment 10.0.0.0/24 of the VPC 3 350, the router 2 344 forwards the packet to the gateway 2 370; and a routing rule 4: When the destination IP address of the packet received by the router 2 370 is a private network address segment 192.168.0.0/24 of the subnet 2 341, the router 2 370 forwards the packet to the subnet 2 341.

It should be noted that the gateway 1 360 may have two private network addresses. One private network address belongs to the VPC 1 330, and is used for internal setting and management of the gateway disposed in the VPC 1 330. The other address belongs to the VPC 3 350 (for example, 10.0.0.9), and is used for external communication. This patent application relates to external communication. Therefore, the private network address of the gateway 1 360 in this patent application is a private network address of the gateway 1 360 that belongs to the VPC 3 350. Similarly, the gateway 2 370 may also have two private network addresses, and details are not described herein.

Figure 4:
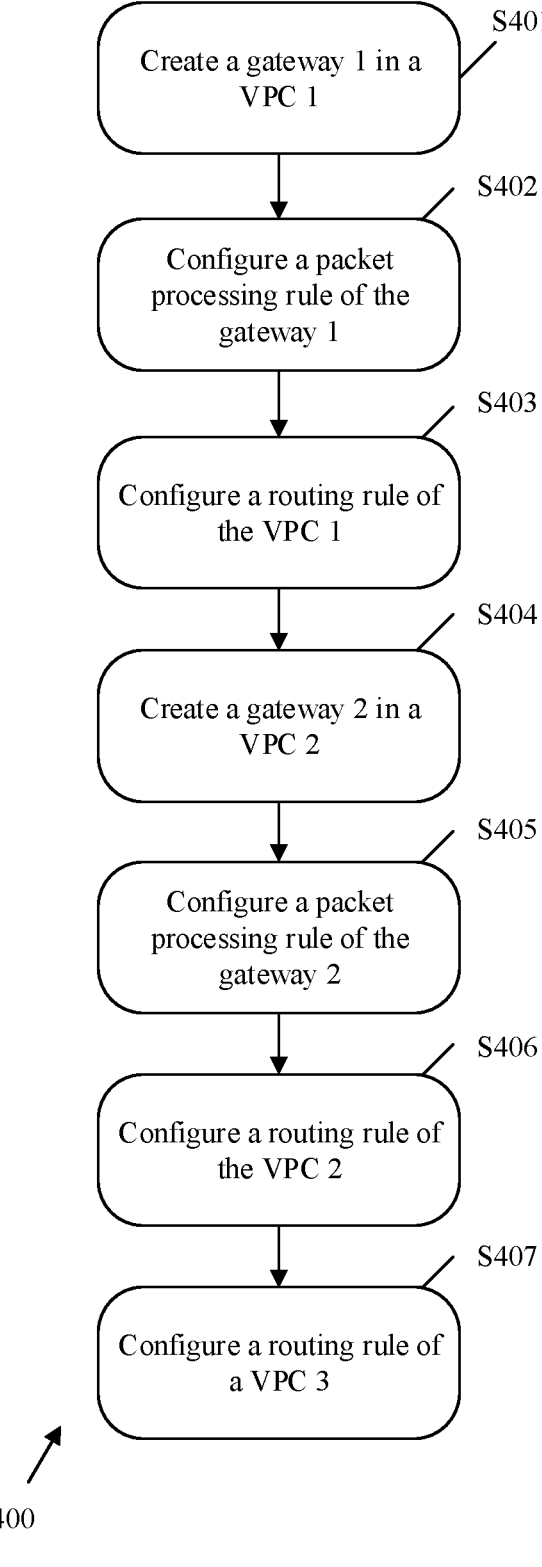
FIG. 4 is a flowchart of a method for configuring VPC communication according to an embodiment of the present disclosure.

The following describes a method for setting the foregoing corresponding rules of the gateway and the router with reference to FIG. 4. FIG. 4 is a flowchart of a method 400 for configuring VPC communication according to an embodiment of the present disclosure. The method is performed by a control platform 6, and the method includes the following steps.

Step S401: Create a gateway 1 360 in a VPC 1 330.

FIG. 5A shows a settings interface 1 of the VPC 1 330. In the interface, a user needs to enter a gateway name (the gateway 1 360), a VPC (the VPC 1 330) in which the gateway is located, a VPC (a VPC 3 350) to which the gateway is to connect, and a private network address 10.0.0.9 of the VPC to which the gateway is to connect.

Step S402 of FIG. 4: Configure a packet processing rule of the gateway 1 360.

FIG. 5B shows a settings interface 2 of the VPC 1 330. In the interface, the user enters a packet processing rule of the created gateway 1 360. The packet processing rule shown in FIG. 5B is the packet processing rule 1 and the packet processing rule 2 of the gateway 1 360 that are shown in FIG. 3.

The packet processing rule 1 includes a source network address translation (SNAT) rule, and the packet processing rule 2 includes a destination network address translation (DNAT) rule.

Step S403: Configure a routing rule of the VPC 1 330.

FIG. 5C shows a settings interface 3 of the VPC 1 330. In the interface, the user enters a routing rule of a router 1 334, the packet processing rule 1 and the packet processing rule 2 that are shown in FIG. 2.

Step S404: Create a gateway 2 370 in a VPC 2 340.

FIG. 5D shows a settings interface 1 of the VPC 2 340. In the interface, the user needs to enter a gateway name (the gateway 2 370), a VPC in which the gateway is located (the VPC 2 340), the VPC to which the gateway is to connect (the VPC 3 350), and a private network address 10.0.0.10 of the VPC to which the gateway is to connect.

Step S405: Configure a packet processing rule of the gateway 2 370.

Figure 5E:
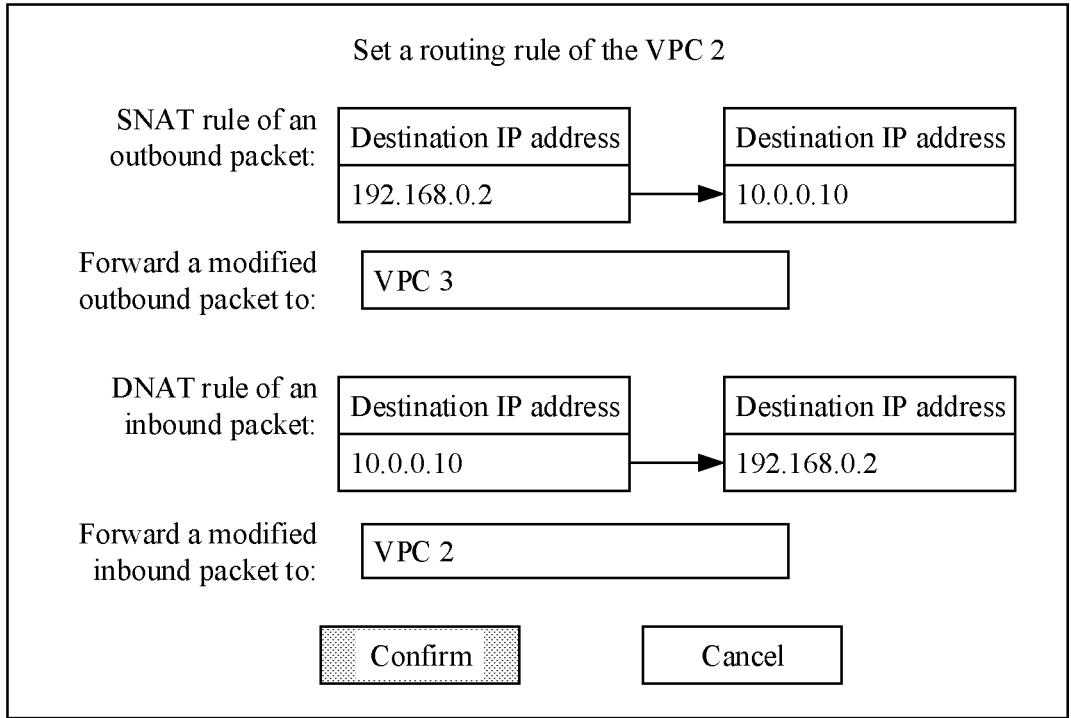

FIG. 5E shows a settings interface 2 of the VPC 2 340. In the interface, the user enters a packet processing rule of the created gateway 2 370. The packet processing rule shown in FIG. 5E is the packet processing rule 3 and the packet processing rule 4 of the gateway 2 370 that are shown in FIG. 2.

Step S406: Configure a routing rule of the VPC 2 340.

Figure 5F:
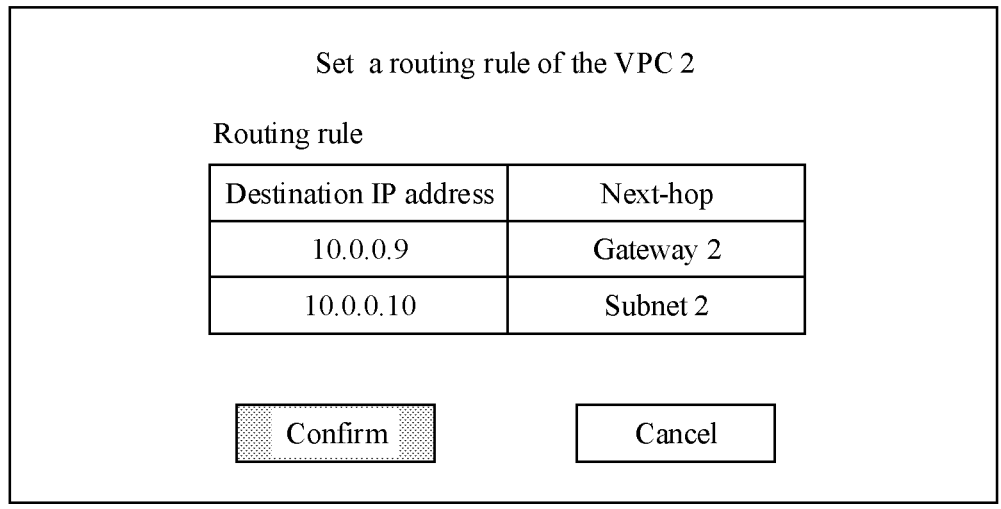

FIG. 5F shows a settings interface 3 of the VPC 2 340. In the interface, the user enters a routing rule of a router 2 344, the packet processing rule 3 and the packet processing rule 4 that are shown in FIG. 2.

Step S407: Configure a routing rule of the VPC 3 350.

Figure 5G:
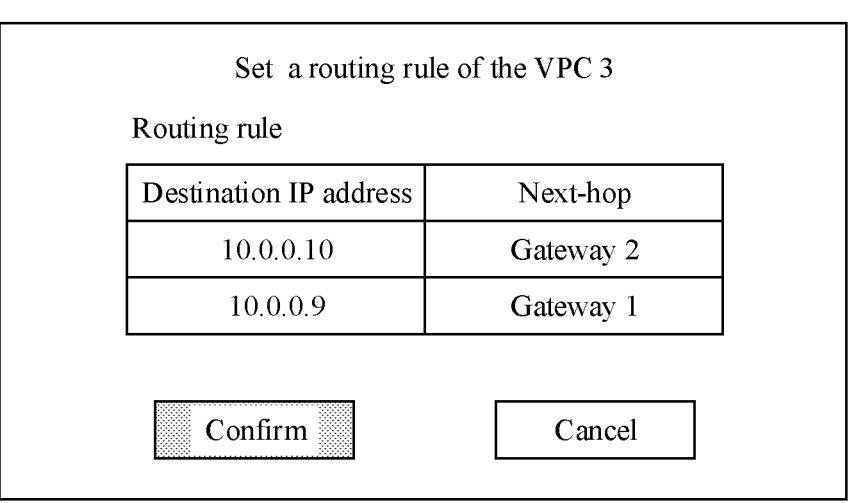

FIG. 5G shows a settings interface of the VPC 3 350. In the interface, the user enters a routing rule of a router 3 354, the packet processing rule 5 and the packet processing rule 6 that are shown in FIG. 2.

A sequence of steps S401 to S407 may be adjusted as required. For example, the step of creating a gateway 2 370 may be first performed, and then the step of creating a gateway 1 360 is performed. This is not limited in this embodiment of the present disclosure.

It should be noted that the foregoing configuration information is entered, by using a client 7, by the user to a VPC configuration interface provided by the control platform 6. The control platform 316 configures the VPC 1 330 and the VPC 2 340 based on the configuration information.

After the control platform 316 performs the foregoing configuration method, the VPC communications system 300 shown in FIG. 3 may be implemented in a cloud data center 10.

Figure 6A:
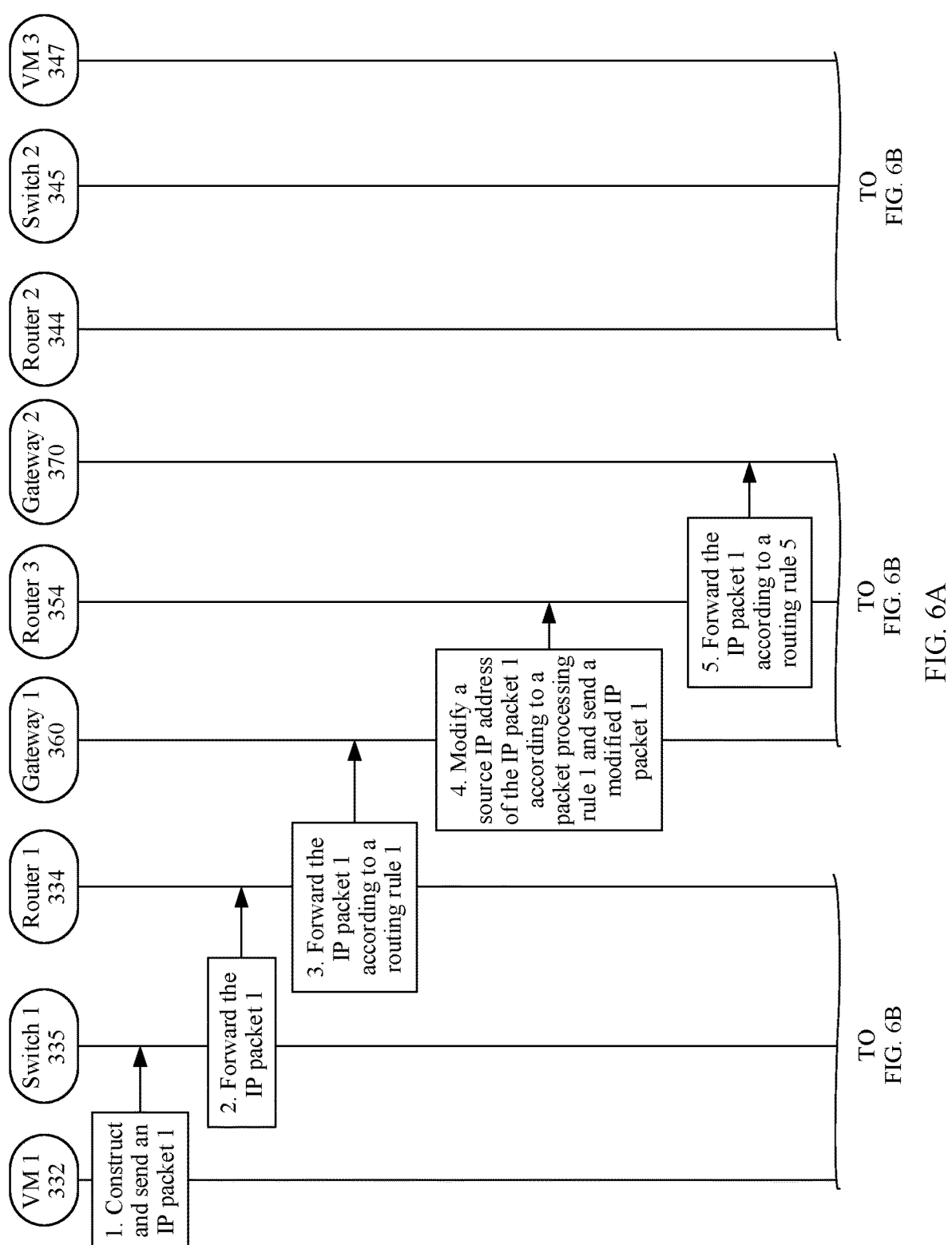
FIG. 6A to FIG. 6C show a diagram of a VPC communications system according to an embodiment of the present disclosure.
Figures 6A, 6B, 6C:
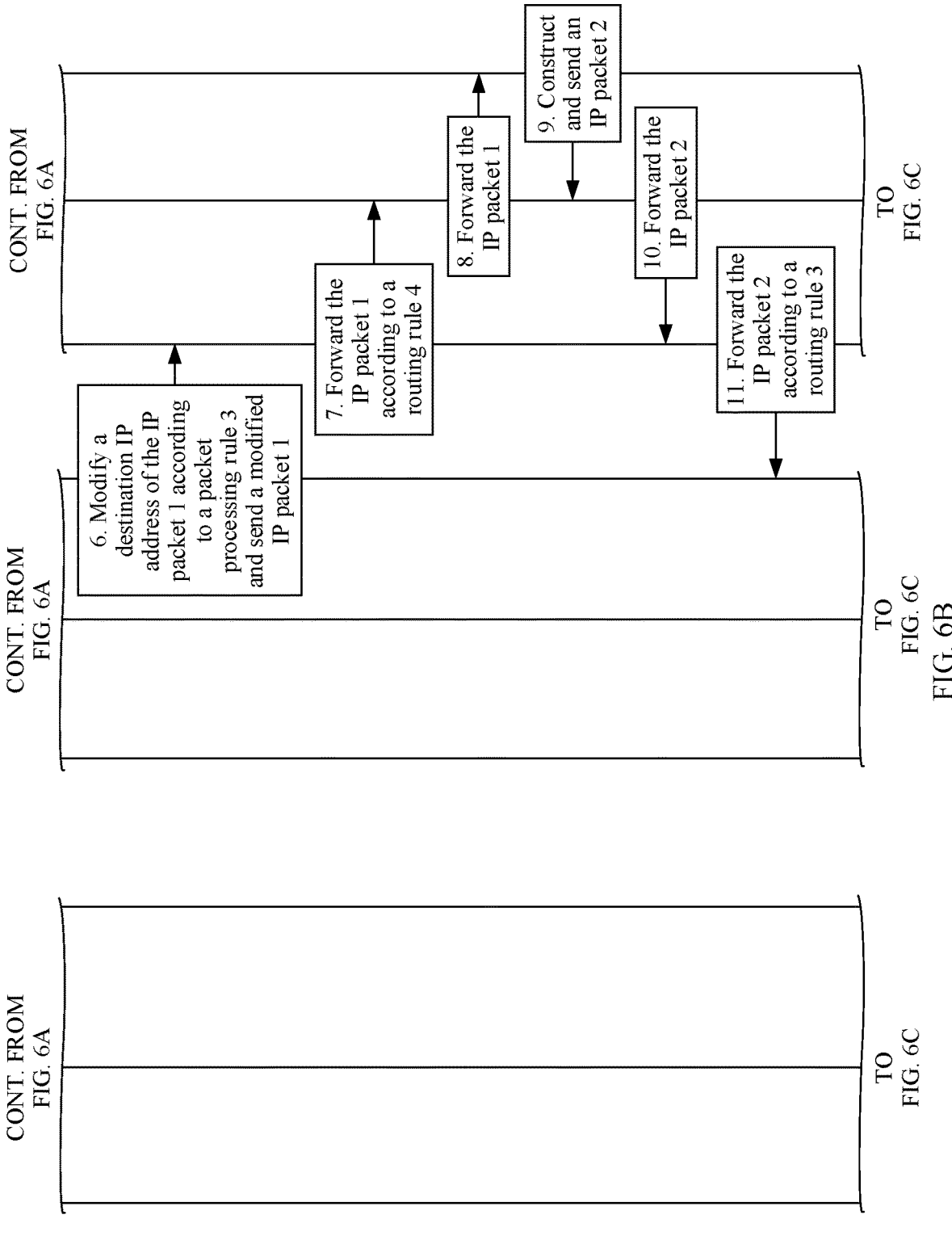
Figure 6C:
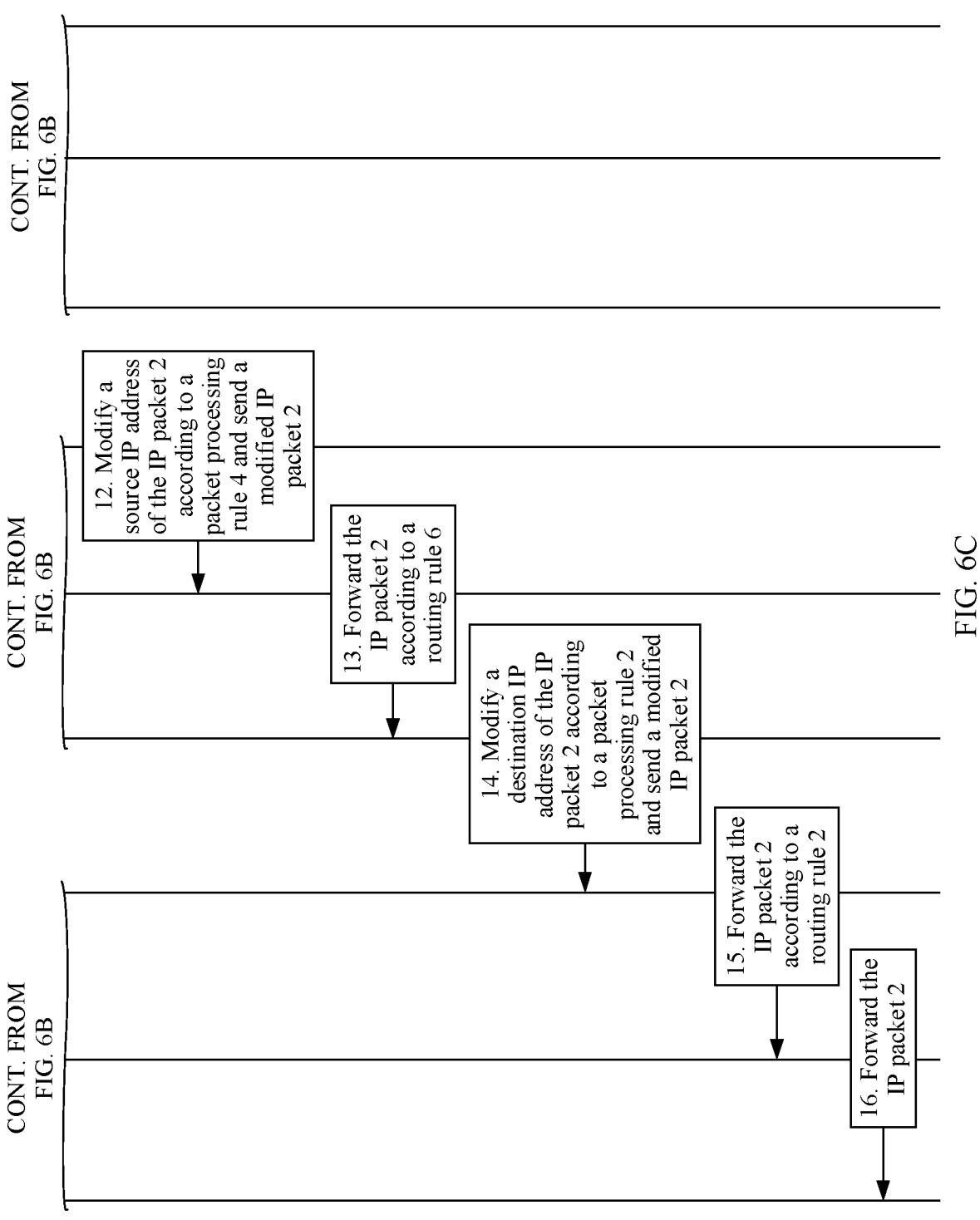

FIG. 6A to FIG. 6C are a data interaction diagram of a VPC communication method according to an embodiment of the present disclosure. The method is based on the VPC communications system shown in FIG. 3A and FIG. 3B, and shows a packet flow direction when a VM 1 accesses a VM 3 across VPCs.

As shown in FIG. 6A to FIG. 6C, the VPC communication method according to this embodiment of the present disclosure includes the following steps.

Step 1: The VM 1 constructs an IP packet 1 and sends the IP packet 1 to a switch 1.

A source IP address of an IP header of the IP packet 1 is a private network address 192.168.0.2 of the VM 1 in a subnet 1, a destination IP address of the IP header of the IP packet 1 is a private network address 10.0.0.10 of a gateway 2 in a subnet 3, and a data part of the IP packet 1 carries request information.

It should be noted that the VM 1 may query for a correspondence between 10.0.0.10 and the VM 3 in advance based on a service requirement. For example, the VM 1 may query a VPC 2 for the correspondence between 10.0.0.10 and the VM 3, and may also query a control platform 6 for the correspondence between 10.0.0.10 and the VM 3.

Step 2: The switch 1 forwards the IP packet 1 to a router 1.

After receiving the IP packet 1, the switch 1 determines that the destination IP address of the IP packet 1 does not belong to the subnet 1, and sends the IP packet 1 to the router 1 to perform cross-network-segment packet transmission.

Step 3: The router 1 forwards the IP packet 1 according to a routing rule 1.

After receiving the IP packet 1, the router 1 matches the routing rule 1 based on the destination IP address (10.0.0.10) of the IP packet 1, and sends the IP packet 1 to a gateway 1 according to the routing rule 1.

Step 4: The gateway 1 modifies the source IP address of the IP packet 1 according to a packet processing rule 1, and sends a modified IP packet 1 to a router 3.

After the gateway 1 receives the IP packet 1 from the router 1, because the IP packet 1 is from the router 1, the gateway 1 determines that the IP packet 1 is an outbound packet, matches the packet processing rule 1 based on the source IP address of the IP packet 1, modifies the source IP address of the IP packet 1 from 192.168.0.2 to 10.0.0.9, and sends a modified IP packet 1 to the router 3.

Step 5: The router 3 forwards the IP packet 1 to the gateway 2 according to a routing rule 5.

After receiving the IP packet 1, the router 3 matches the routing rule 5 based on the destination IP address (10.0.0.10) of the IP packet 1, and forwards the IP packet 1 to the gateway 2.

Step 6: The gateway 2 modifies the destination IP address of the IP packet 1 according to a packet processing rule 3, and sends a modified IP packet 1 to a router 2.

After the gateway 2 receives the IP packet 1 from the router 3, because the IP packet 1 is from the router 3, the gateway 2 determines that the IP packet 1 is an inbound packet, matches the packet processing rule 3 based on the destination address of the IP packet 1, modifies the destination IP address of the IP packet 1 from 10.0.0.10 to 192.168.0.2, and sends a modified IP packet 1 to the router 2.

Step 7: The router 2 forwards the modified IP packet 1 to a switch 2 according to a routing rule 4.

The router 2 matches the routing rule 4 based on the destination IP address 192.168.0.2 of the IP packet 1, and sends the IP packet 1 to a subnet 2. The switch 2 is disposed in a subnet 2, the switch 2 that sends the IP packet 1 to the switch 2 in the subnet 2.

Step 8: The switch 2 sends the IP packet 1 to the VM 3.

The switch 2 sends the IP packet 1 to the VM 3 based on the destination IP address 192.168.0.2 of the IP packet 1.

Step 9: The VM 3 constructs an IP packet 2 and sends the IP packet 2 to the switch 2.

The IP packet 2 is a reply packet of the IP packet 1.

After receiving the IP packet 1, the VM 3 obtains the request information from the data part of the IP packet 1, generates reply information based on the request information, and constructs the IP packet 2. The VM 3 sets the source IP address 10.0.0.9 of the IP packet 1 to a destination IP address of the IP packet 2, and sets the destination IP address 192.168.0.2 of the IP packet 1 to a source IP address of the IP packet 2, sets the reply information in a data part of the IP packet 2, and sends the IP packet 2 to the switch 2.

Step 10: The switch 2 forwards the IP packet 2 to the router 2.

After receiving the IP packet 2, the switch 2 determines that the destination IP address 10.0.0.9 of the IP packet 2 does not belong to the subnet 1 (192.168.0.0/24), and sends the IP packet 2 to the router 2 to perform cross-network-segment packet transmission.

Step 11: The router 2 forwards the IP packet 2 according to a routing rule 3.

After receiving the IP packet 2, the router 2 matches the routing rule 3 based on the destination IP address (10.0.0.9) of the IP packet 2, and sends the IP packet 2 to the gateway 2 according to the routing rule 3.

Step 12: The gateway 2 modifies the source IP address of the IP packet 2 according to a packet processing rule 4, and sends a modified IP packet 2 to the router 3.

After the gateway 2 receives the IP packet 2 from the router 2, because the IP packet 2 is from the router 2, the gateway 2 determines that the IP packet 2 is an outbound packet, matches the packet processing rule 4 based on the source IP address of the IP packet 2, modifies the source IP address of the IP packet 2 from 192.168.0.2 to 10.0.0.10, and sends a modified IP packet 2 to the router 3.

Step 13: The router 3 forwards the IP packet 2 to the gateway 1 according to a routing rule 6.

After receiving the IP packet 2, the router 3 matches the routing rule 6 based on the destination IP address (10.0.0.9) of the IP packet 2, and forwards the IP packet 2 to the gateway 1.

Step 14: The gateway 1 modifies the destination IP address of the IP packet 2 according to a packet processing rule 2, and sends a modified IP packet 2 to the router 1.

After the gateway 1 receives the IP packet 2 from the router 3, because the IP packet 2 is from the router 3, the gateway 1 determines that the IP packet 2 is an inbound packet, matches the packet processing rule 2 based on the destination address of the IP packet 2, modifies the destination IP address of the IP packet 2 from 10.0.0.9 to 192.168.0.2, and sends a modified IP packet 2 to the router 1.

Step 15: The router 1 forwards the modified IP packet 2 to the switch 1 according to a routing rule 2.

The router 1 matches the routing rule 2 based on the destination IP address 192.168.0.2 of the IP packet 2, and sends the IP packet 2 to the subnet 1. The switch 1 is disposed in the subnet 1, the switch 1 that sends the IP packet 2 to the switch 1 in the subnet 1.

Step 16: The switch 1 forwards the IP packet 2 to the VM 1.

The switch 1 forwards the IP packet 2 to the VM 1 based on the destination IP address 192.168.0.2 of the IP packet 2.

After receiving the IP packet 2, the VM 1 determines that the IP packet 2 is the reply packet of the IP packet 1 based on the source IP address 10.0.0.10 and the destination IP address 192.168.0.2 of the IP packet 2 (because the source IP address and the destination IP address of the IP packet 2 are inverted compared with those of the IP packet 1). The VM 1 obtains the reply information from the data part of the IP packet 2 to complete a communication process between the VM 1 and the VM 2.

To sum up, the gateway 1, the gateway 2 and a VPC 3 are configured in a cloud data center 10, and the routers of a VPC 1, the VPC 2, and the VPC 3, and the gateway 1 and the gateway 2 are configured so that the VM 1 and the VM 3 can communicate with each other when the VM 1 and the VM 3 have the same private network address.

For example, this embodiment of the present disclosure is applicable to the following scenario: The VPC 3 is used as a large internal network of an enterprise, and the VPC 1 and the VPC 2 are used as small internal networks of the enterprise. For example, the VPC 1 is a virtual network of a finance department, the VPC 2 is a virtual network of a research and development department, and the VPC 3 is a virtual network of an IT management department of the enterprise. When private network addresses of the VPC 1 and the VPC 2 overlap with each other, a private network address of the VPC 3 may be applied for from the control platform 6. For example, the VPC 1 applies for a private network address 1 of the VPC 3, and the VPC 2 applies for a private network address 2 of the VPC 3. A virtual machine in the VPC 1 is bound with the private network address 1 by using a gateway, and a virtual machine in the VPC 2 is bound with the private network address 2 by using a gateway. The virtual machine in the VPC 1 can access the virtual machine in the VPC 2 by accessing the private network address 2, and the virtual machine in the VPC 2 can access the virtual machine in the VPC 1 by accessing the private network address 1. In this way, a technical problem that different VPCs of the enterprise cannot communicate with each other due to overlapping private network addresses is resolved.

It should be noted that the VPC 1, the VPC 2, and the VPC 3 may belong to different users, and the different users log in to their VPCs by using their own accounts. When the VPC 1 needs to connect to the VPC 3, a user of the VPC 1 may enter an account of a user of the VPC 3 on the control platform. The control platform sends a request to a settings interface of the VPC 3 based on the account of the user of the VPC 3, and the user of the VPC 3 can confirm whether to accept the request on the settings interface of the VPC 3. If the request is accepted, the control platform establishes a connection between the VPC 1 and the VPC 3. The VPC 2 and the VPC 3 are connected in a similar way.

In another embodiment, when the VPC 1, the VPC 2, and the VPC 3 belong to a same user, the user may log in to the VPC 1, the VPC 2, and the VPC 3 by using one account. In this case, the control platform does not need to send a request.

The user can register an account on the control platform and use the account to purchase a VPC on a payment page provided by the control platform.

Figure 7A:
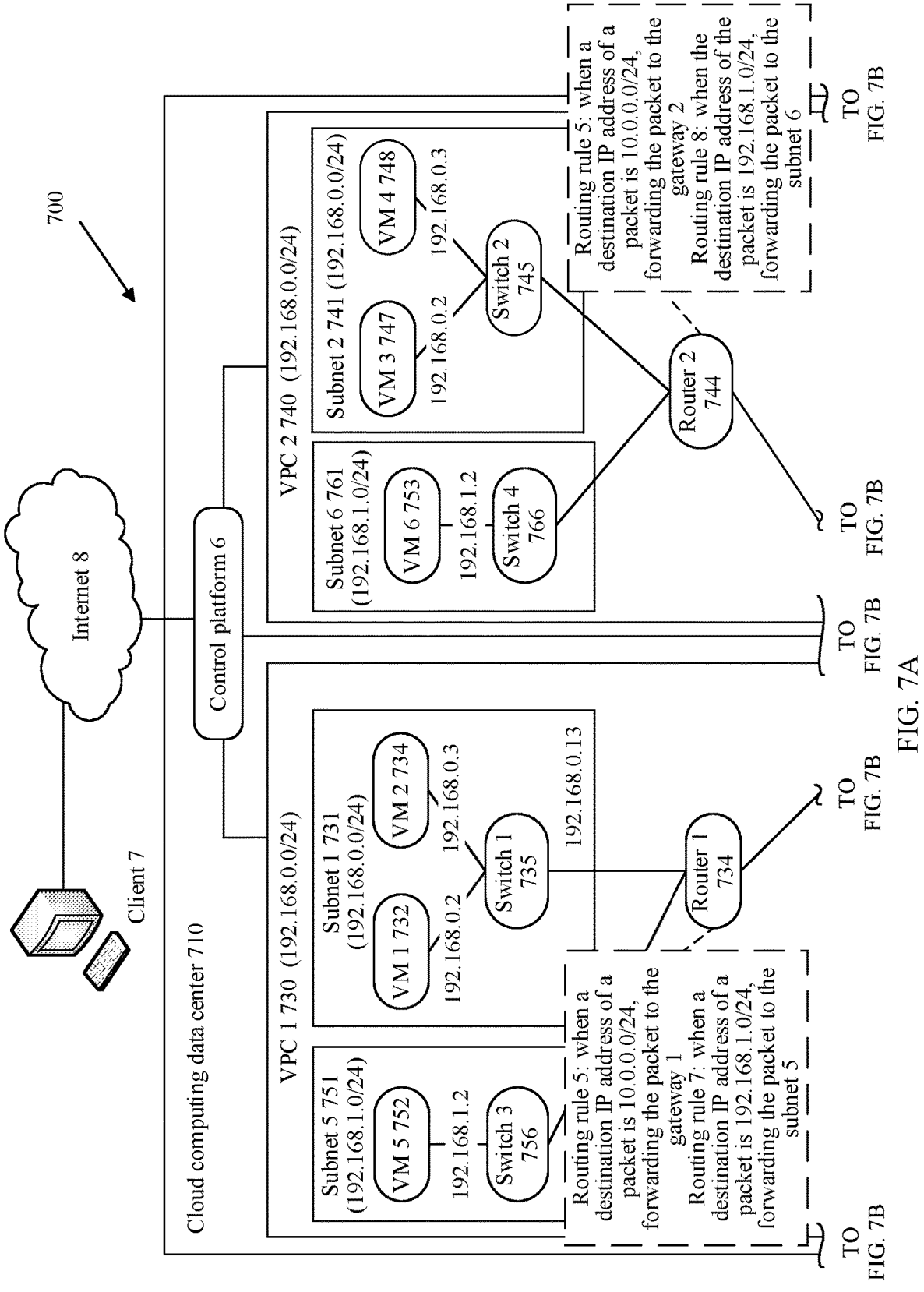
FIG. 7A and FIG. 7B show a diagram of a VPC communications system according to an embodiment of the present disclosure.
Figure 7B:
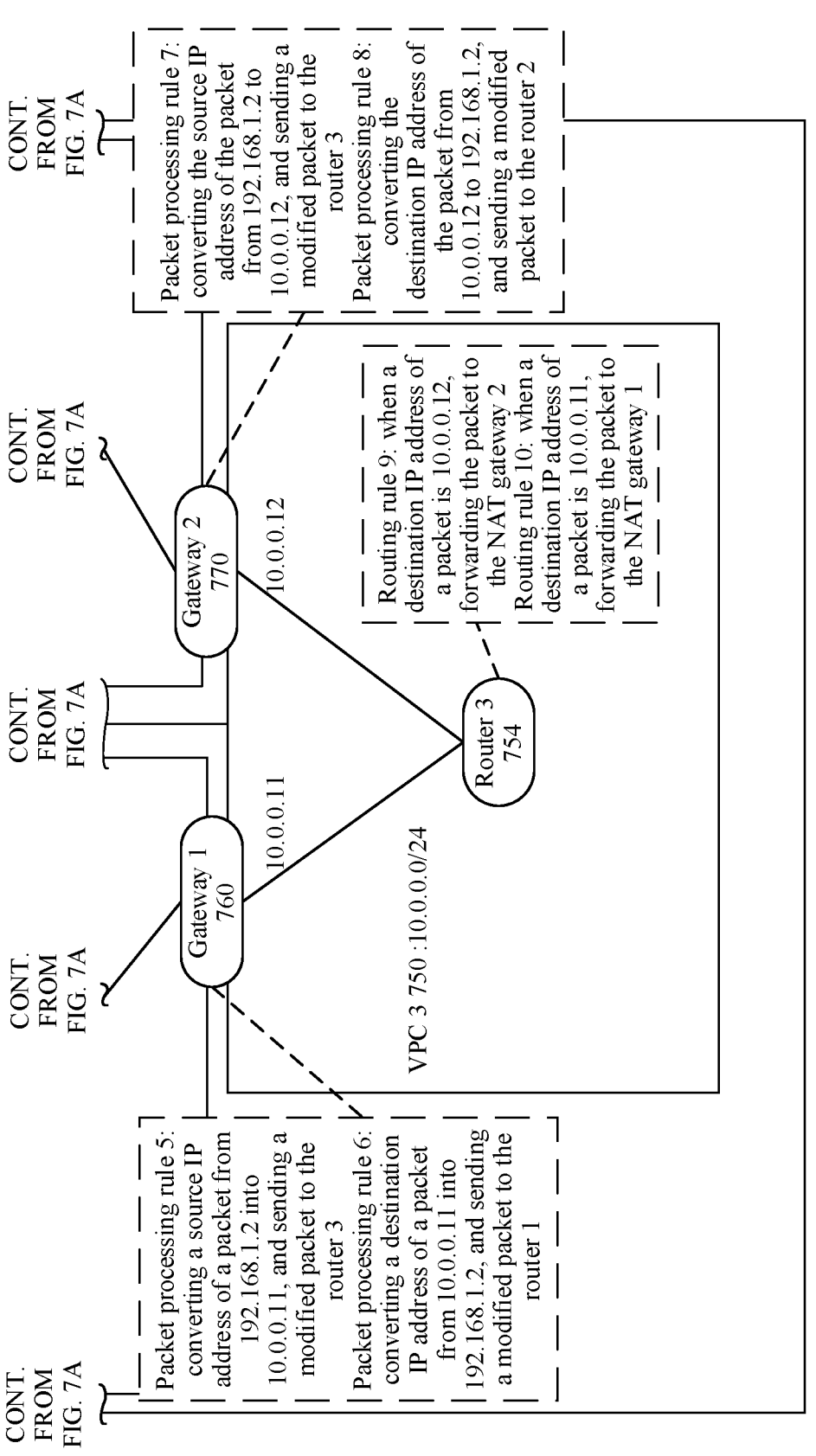

FIG. 7A and FIG. 7B show a diagram of a VPC communications system 700 according to an embodiment of the present disclosure. In this embodiment, with respect to the embodiment shown in FIG. 2, a gateway 1 760 may also be bound with a VM in another subnet of the VPC 1 730, and a gateway 2 770 may also be bound with a VM in another subnet of the VPC 2 740. As shown in FIG. 7A and FIG. 7B, a subnet 5 751 (192.168.1.0/24) is further configured in the VPC 1 730, and a VM 5 is configured in the subnet 5 751. A private network address of the VM 5 is 192.168.1.2. A subnet 6 761 (192.168.1.0/24) is further configured in the VPC 2 740, and a VM 6 is configured in the subnet 6 761. A private network address of the VM 6 is 192.168.1.2.

In this case, if the VM 5 needs to communicate with the VM 6, a routing rule 7 may be configured for a router 1 734: A packet whose destination IP address belongs to 192.168.1.0/24 is forwarded to the subnet 5 751; a routing rule 8 is added to a router 2 744: The packet whose destination IP address belongs to 192.168.1.0/24 is forwarded to the subnet 6 761, and a private network address (for example, 10.0.0.11) of a VPC 3 750 is allocated to the gateway 1 760; a packet processing rule 5 is set for the gateway 1 760: When a source IP address of an outbound packet is 192.168.1.2, the source IP address is modified to 10.0.0.11. A packet processing rule 6 is set for the gateway 1 760: When a destination IP address of an inbound packet is 10.0.0.11, the destination IP address is modified to 192.168.1.2.

A private network address (for example, 10.0.0.12) of the VPC 3 750 is allocated to the gateway 2 770, and a packet processing rule 7 is set for the gateway 2 770: When the source IP address of the outbound packet is 192.168.1.2, the source IP address of the outbound packet is modified to 10.0.0.12, and a modified outbound packet is sent to a router 3 754. A packet processing rule 8 is set for the gateway 2 770: When the destination IP address of the inbound packet is 10.0.0.12, the destination IP address of the inbound packet is modified to 192.168.1.2.

A routing rule 9 is set for the router 3 754: When a destination IP address of a packet is 10.0.0.12, the packet is sent to the gateway 2 770. A routing rule 10 is set for the router 3 754: When a destination IP address of a packet is 10.0.0.11, the packet is sent to the gateway 1 760.

Based on the foregoing configuration, the VM 5 may construct an IP packet whose source IP address is 192.168.1.2 and whose destination IP address is 10.0.0.12, and send the IP packet to the VM 6 in a communication manner similar to that in the foregoing embodiments by using the router 1 734, the gateway 1 760, the router 3 754, the gateway 2 770, and the router 2 744. In addition, an IP packet that is returned by the VM 6 and that is used for reply may also be sent to the VM 1 by using the router 2 744, the gateway 2 770, the router 3 754, the gateway 1 760, and the router 1 734.

Therefore, in this embodiment of the present disclosure, different rules are set for the gateways and the routers, so that different subnets that are in the VPC 1 730 and the VPC 2 740 and that have a same private network address segment can communicate with each other.

Figure 8A:
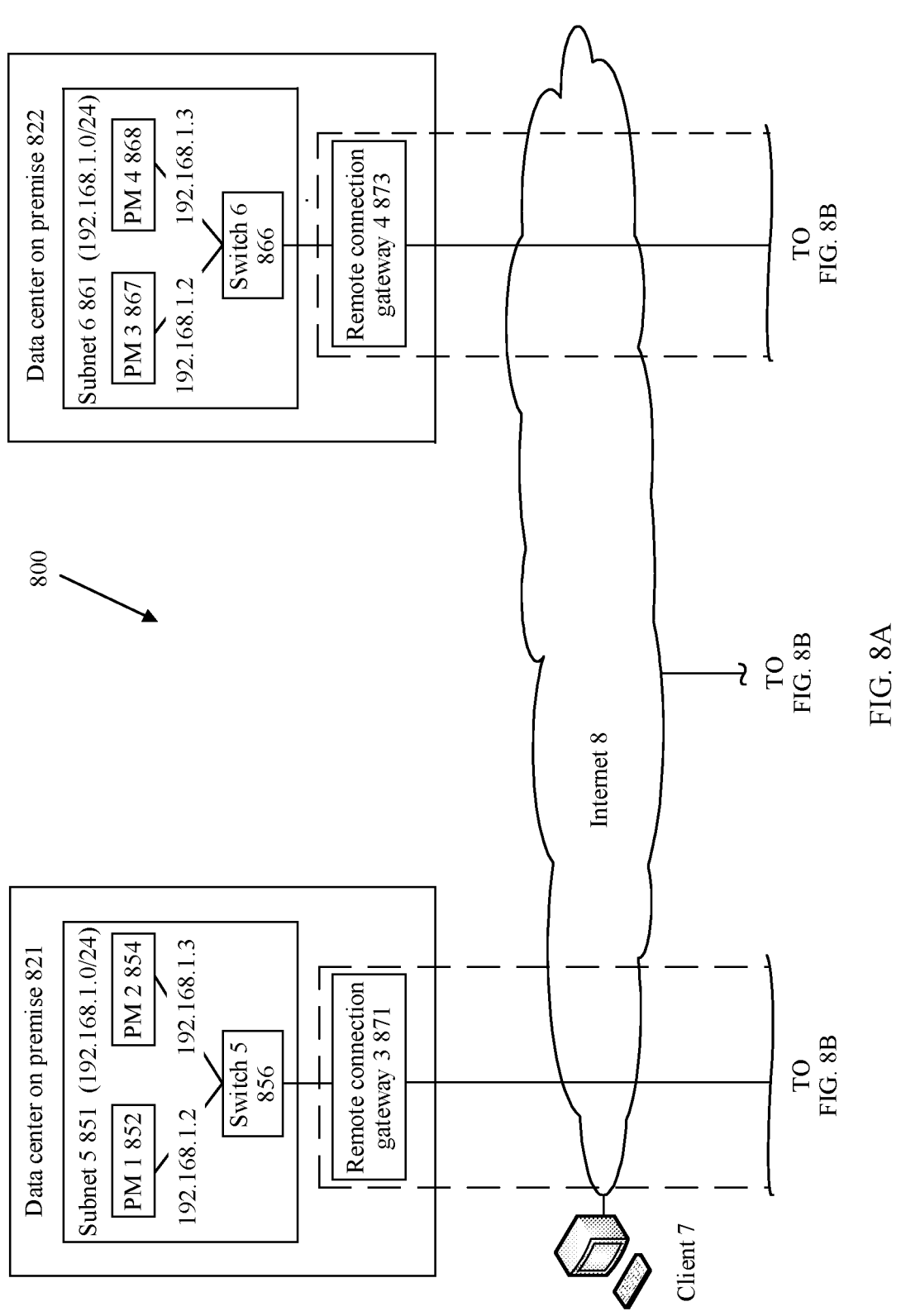
FIG. 8A to FIG. 8C show a diagram of a VPC communications system according to an embodiment of the present disclosure.
Figure 8B:
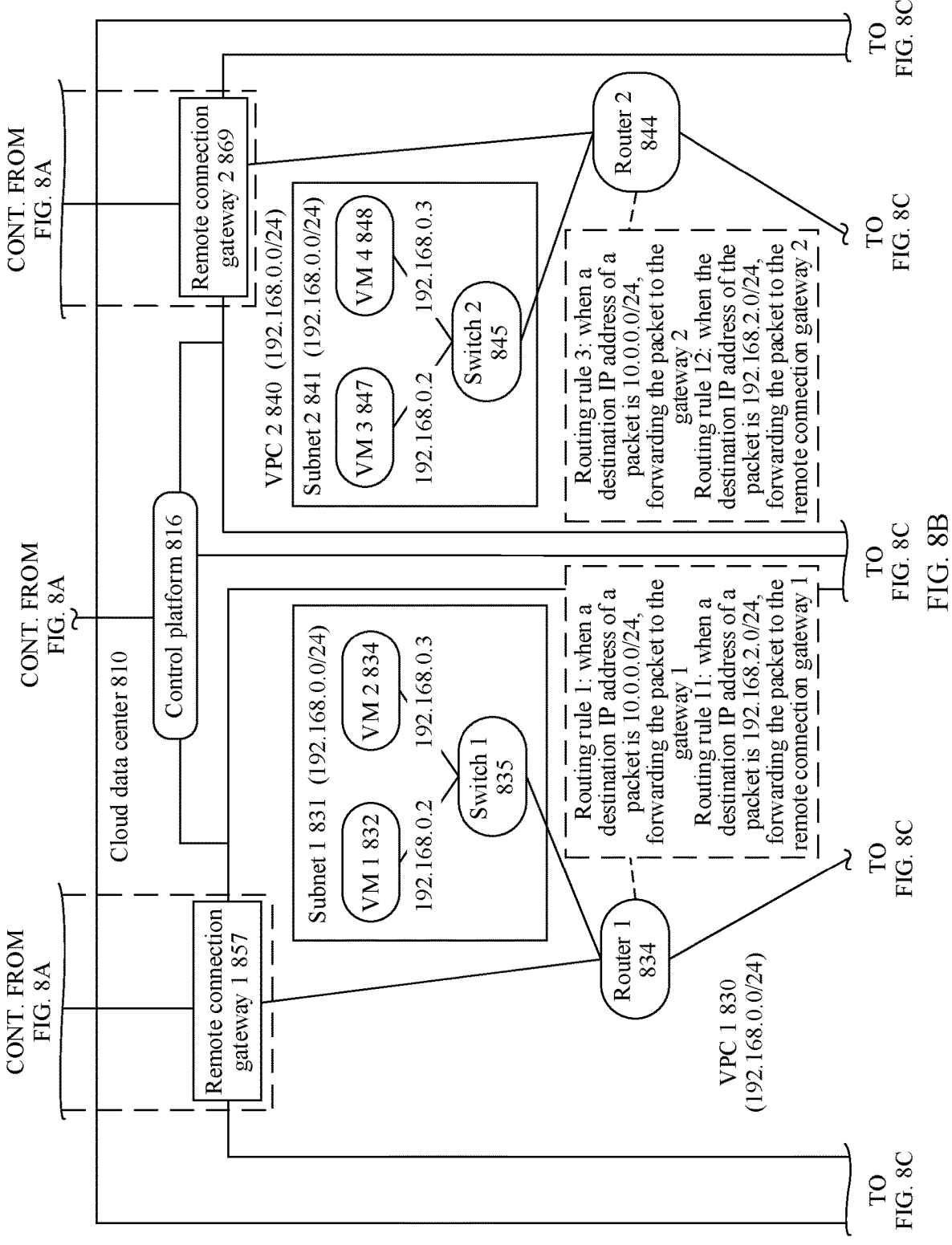
Figure 8C:
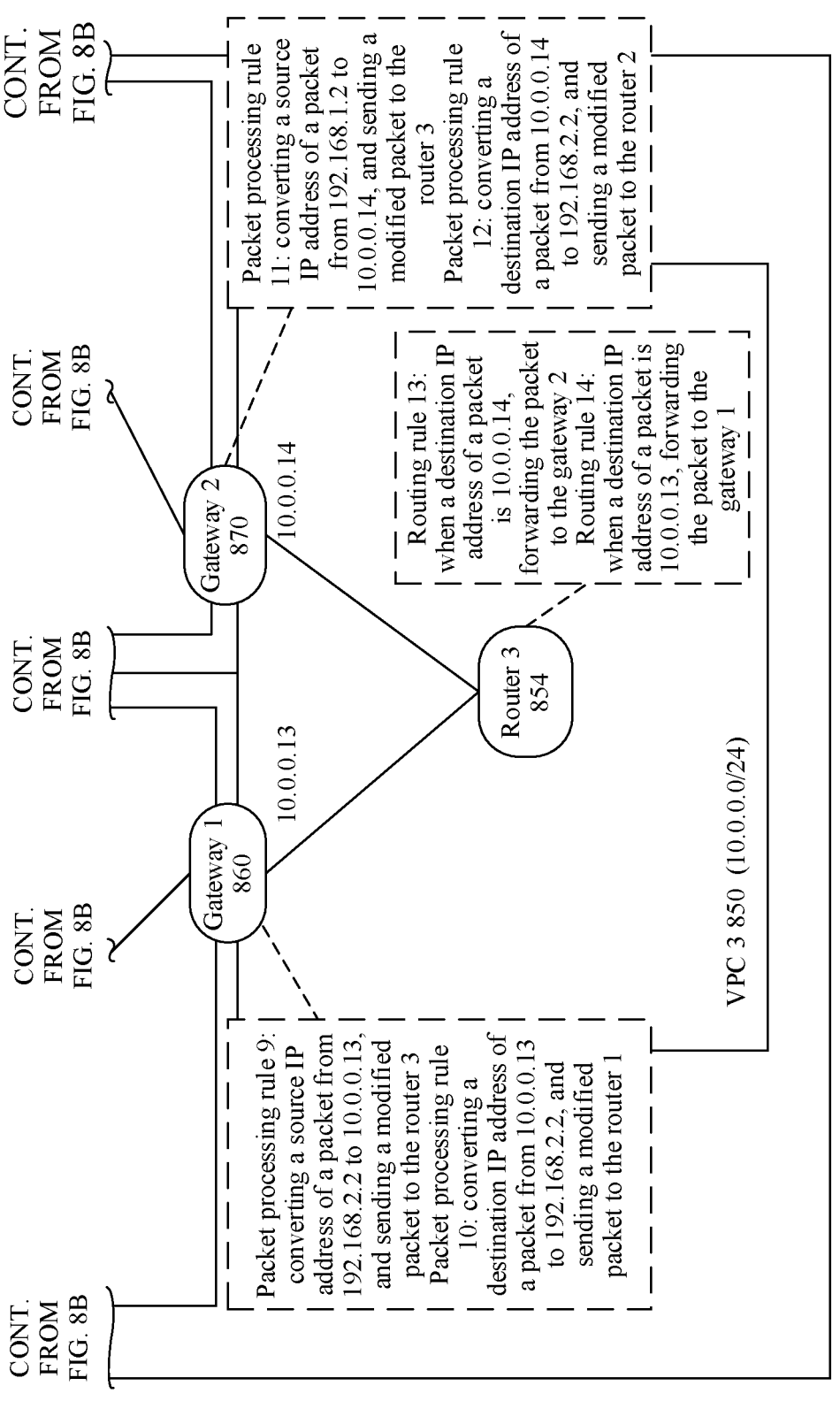

Further, the embodiments of the present disclosure may also implement communication between data centers on premise when private network addresses overlap with each other. FIG. 8A to FIG. 8C show a diagram of a VPC communications system 800 according to an embodiment of the present disclosure. In FIG. 8A to FIG. 8C, a data center on premise 821 and a data center on premise 822 are added based on the embodiment shown in FIG. 3A and FIG. 3B. The data center on premise 821 includes a subnet 5 851, and a physical machine (PM) 1 852 and a PM 2 854 are disposed in the subnet 5 851. The data center on premise 822 includes a subnet 6 861, and a physical machine (PM) 3 867 and a PM 4 868 are disposed in the subnet 6 861. The subnet 5 851 accesses a remote connection gateway 1 857 in a VPC 1 330 by using a remote connection gateway 3 871, and the subnet 6 861 accesses a remote connection gateway 2 869 in a VPC 2 340 by using a remote connection gateway 4 873. A remote communication tunnel is formed between the remote connection gateway 3 871 and the remote connection gateway 1 857, and a remote communication tunnel is formed between the remote connection gateway 4 873 and the remote connection gateway 2 869. An IP packet may be transmitted in the remote communication tunnel, and the IP packet remains unchanged in a transmission process.

It should be noted that the remote connection gateway 1 857 in the VPC 1 330 and the remote connection gateway 2 869 in the VPC 2 340 may be configured by a control platform 6 based on configuration information, and the configuration information is entered by a user to the control platform 6 by using a client 7.

For example, the remote communication gateway may be a virtual private network (VPN) gateway or a manual gateway.

As shown in FIG. 8A to FIG. 8C, a private network address of the subnet 5 851 overlaps with a private network address of the subnet 6 861, the PM 1 852 needs to communicate with the PM 3 867, a routing rule 11 may be added to a router 1 834. A packet whose destination IP address belongs to 192.168.2.0/24 is forwarded to the remote connection gateway 1 857; a routing rule 12 is added to a router 2 844: The packet whose destination IP address belongs to 192.168.2.0/24 is forwarded to the remote connection gateway 2 869, and a private network address (for example, 10.0.0.13) of a VPC 3 350 is allocated to a gateway 1 360; a packet processing rule 9 is set for the gateway 1 360: When a source IP address of an outbound packet is 192.168.2.2, the source IP address is modified to 10.0.0.13; a packet processing rule 10 is set for the gateway 1 360: When a destination IP address of an inbound packet is 10.0.0.13, the destination IP address is modified to 192.168.2.2.

A private network address (for example, 10.0.0.14) of the VPC 3 350 is allocated to a gateway 2 370, a packet processing rule 11 is set for the gateway 2 370: When the source IP address of the outbound packet is 192.168.2.2, the source IP address is modified to 10.0.0.14, and a modified outbound packet is sent to a router 3 854. A packet processing rule 12 is set for the gateway 2 370: When the destination IP address of the inbound packet is 10.0.0.14, the destination IP address is modified to 192.168.2.2, and a modified inbound packet is sent to the router 2 844.

A routing rule 13 is set for the router 3 854: When a destination IP address of a packet is 10.0.0.14, the packet is sent to the gateway 2 370. A routing rule 14 is set for the router 3 854: When a destination IP address of a packet is 10.0.0.13, the packet is sent to the gateway 1 360.

Based on the foregoing configuration, the PM 1 852 may construct an IP packet whose source IP address is 192.168.2.2 and whose destination IP address is 10.0.0.14. The packet is forwarded by a switch 5 856 to the remote connection gateway 3 871, is sent to the remote connection gateway 1 857 by using the remote communication tunnel, and is sent by the remote connection gateway 1 857 to the router 1 834. Then, the IP packet is sent to the remote connection gateway 2 869 by using the router 1 834, the gateway 1 360, the router 3 854, the gateway 2 370, and the router 2 844 in a communication manner similar to that in the foregoing embodiments, and is sent to the remote connection gateway 4 873 by using the remote communication tunnel, to arrive at the PM 3 867 in the subnet 6 861. Similarly, an IP packet that is returned by the PM 3 867 and that is used for reply may also be sent to the PM 1 852.

It should be noted that a PM in a data center on premise may alternatively be replaced by a VM. This is not limited in this embodiment of the present disclosure.

Therefore, in another embodiment of the present disclosure, different rules are set for the gateways and the routers, so that different subnets in a data center on premise that have a same private network address segment can communicate with each other by using the data center on premise.

Figure 9A:
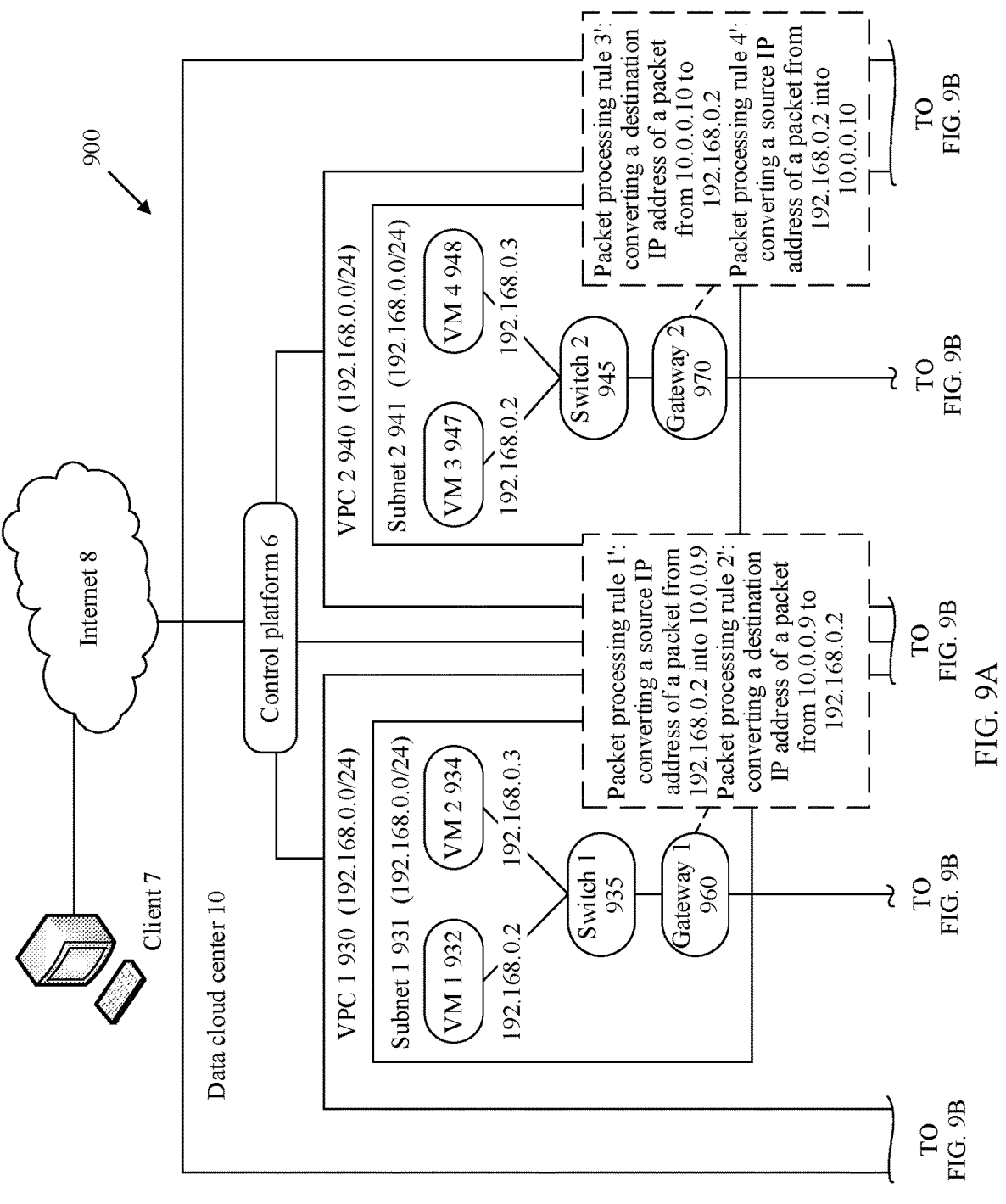
FIG. 9A and FIG. 9B are a diagram of a VPC communications system according to an embodiment of the present disclosure.
Figure 9B:
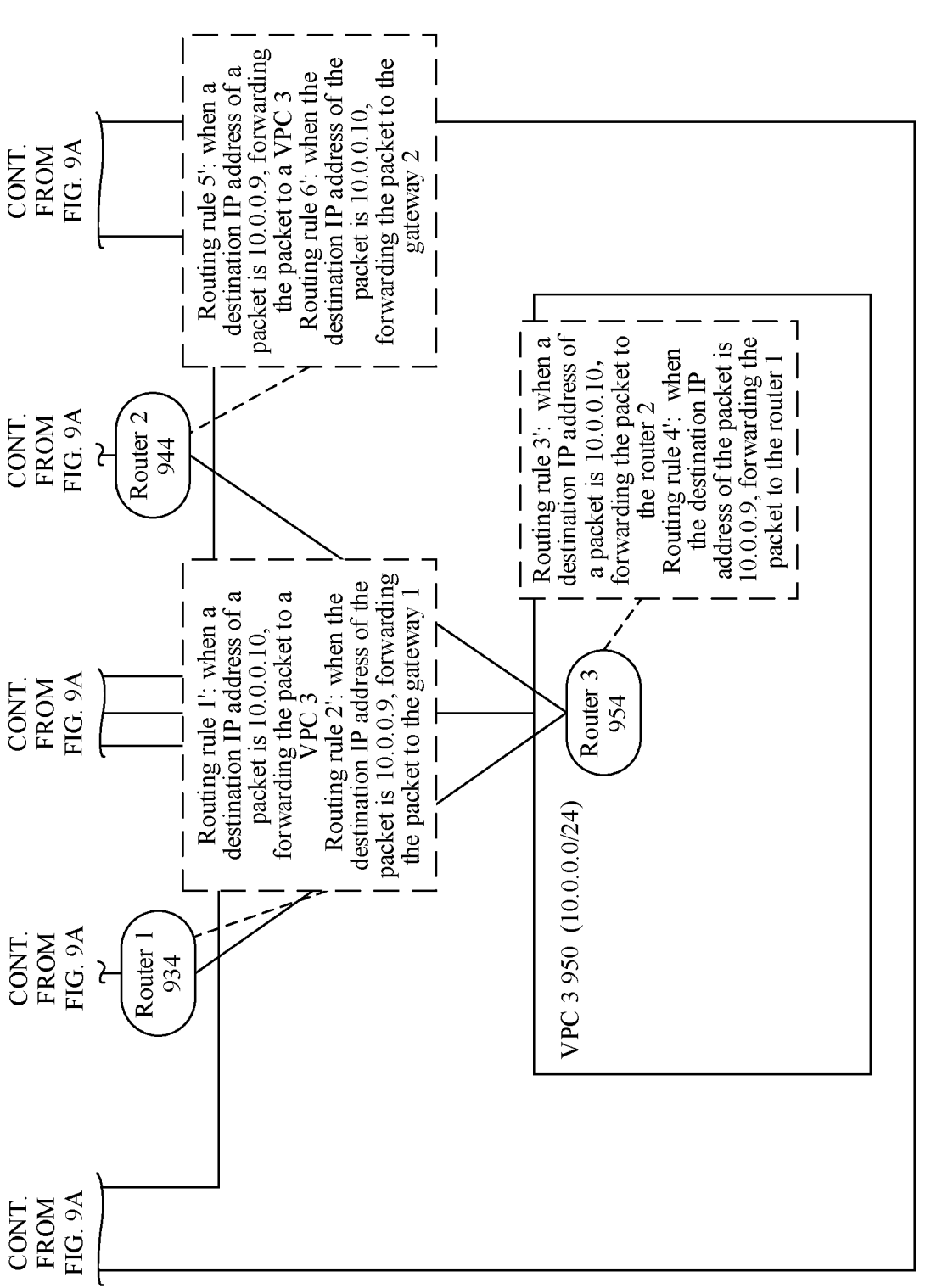

FIG. 9A and FIG. 9B are a diagram of a VPC communications system 900 according to an embodiment of the present disclosure. Compared with the embodiment shown in FIG. 3A and FIG. 3B, in this embodiment, a gateway 1 960 is disposed in a subnet 1 931, and a gateway 2 970 is disposed in a subnet 2 941. In this case, the gateway 1 960 and the gateway 2 970 can support only communication with the subnet 1 931 and the subnet 2 941.

A control platform 6 may allocate a private network address 10.0.0.9 of a private network address segment of the VPC 3 950 (for example, 10.0.0.0/24) to the gateway 1 960 based on configuration information, and allocate another private network address 10.0.0.10 of the private network address segment of the VPC 3 950 (for example, 10.0.0.0/24) to the gateway 2 970. In addition, a router 1 934 is configured to connect to a router 3 954, and a router 2 944 is configured to connect to the router 3 954.

A Router 1 934 is Provided with:

a routing rule 1': When a destination IP address of a packet received by the router 1 934 is 10.0.0.10, the router 1 934 forwards the packet to the VPC 3 950; and a routing rule 2': When the destination IP address of the packet received by the router 1 is 10.0.0.9, the router 1 934 forwards the packet to the gateway 1 960.

The Gateway 1 960 is Provided with:

a packet processing rule 1': When a source IP address of an outbound packet received by the gateway 1 960 is a private network address 192.168.0.2 of a VM 1 932 in the subnet 1 931, the gateway 1 960 converts 192.168.0.2 into the private network address 10.0.0.9 of the gateway 1 960 in the VPC 3 950, and sends a modified outbound packet to the router 1 934; and a packet processing rule 2': When a destination IP address of an inbound packet received by the gateway 1 960 is the private network address 10.0.0.9 of the gateway 1 960 of the VPC 3, the gateway 1 960 converts 10.0.0.9 into the private network address 192.168.0.2 of the VM 1 932 in the subnet 1 931, and sends a modified inbound packet to the gateway 1 960.

The outbound packet is a packet received by the gateway 1 960 from a switch 1 935, and the inbound packet is a packet received by the gateway 1 960 from the router 1 934. The Router 2 934 is Provided with:

a routing rule 5': When a destination IP address of a packet received by the router 2 is 10.0.0.9, the router 2 934 forwards the packet to the VPC 3 950.

a routing rule 6': When the destination IP address of the packet received by the router 2 934 is 10.0.0.10, the router 2 934 forwards the packet to the gateway 2 970.

The Gateway 2 970 is Provided with:

a packet processing rule 3': When a destination IP address of an inbound packet received by the gateway 2 970 is 10.0.0.10, the gateway 2 970 converts 10.0.0.10 into 192.168.0.2, and sends a modified inbound packet to the router 2 934; and a packet processing rule 4': When a source IP address of an outbound packet received by the gateway 2 970 is 192.168.0.2, the gateway 2 970 converts 192.168.0.2 into 10.0.0.10, and sends a modified outbound packet to the router 1 934.

The outbound packet is a packet received by the gateway 2 970 from a switch 2 945, and the inbound packet is a packet received by the gateway 1 960 from the router 2 934. A Router 3 954 is Provided with:

a routing rule 3': When a destination IP address of a packet received by the router 3 954 is 10.0.0.10, the router 3 954 forwards the packet to the router 2 934.

a routing rule 4': When the destination IP address of the packet received by the router 2 934 is 10.0.0.9, the router 2 934 forwards the packet to the router 1 934.

When the VM 1 932 needs to access a VM 3 947 across VPCs, the VM 1 932 constructs an IP packet 1'. A source IP address of the IP packet 1' is the private network address 192.168.0.2 of the VM 1 932 in the subnet 1 931, and a destination IP address of the IP packet 1' is the private network address 10.0.0.10 of the gateway 2 970 in a subnet 3. A data part of the IP packet 1' carries request information.

The VM 1 932 sends the IP packet 1' to the switch 1 935. The switch 1 935 determines that the destination IP address of the IP packet 1' does not belong to the subnet 1 931, and sends the IP packet 1' to the gateway 1 960. The gateway 1 960 matches the packet processing rule 1' for the IP packet 1', converts the source IP address of the IP packet 1 from 192.168.0.2 to 10.0.0.9, and sends a modified IP packet 1' to the router 1 934. The router 1 934 matches the routing rule 2' for the IP packet 1', and forwards the IP packet 1' to the router 3 954 of the VPC 3 950.

The router 3 954 receives the IP packet 1', matches the routing rule 3 for the IP packet 1', and forwards the IP packet 1' to the router 2 934 of a VPC 2 940.

The router 2 934 receives the IP packet 1', matches the routing rule 6 for the IP packet 1', and forwards the IP packet 1' to the gateway 2 970.

The gateway 2 970 receives the IP packet 1', matches the packet processing rule 3' for the IP packet 1', converts the destination IP address of the IP packet 1' from 10.0.0.10 to 192.168.0.2, and sends the IP packet 1' to the switch 2 945. The switch 2 945 sends the IP packet 1' to the VM 3 947.

The VM 3 947 generates reply information based on the request information carried in the data part of the IP packet 1', and constructs an IP packet 2'. The IP packet 2' is a reply packet of the IP packet 1', a source IP address of the IP packet 2' is the destination IP address 192.168.0.2 of the IP packet 1', and a destination IP address of the IP packet 2' is the source IP address 10.0.0.9 of the IP packet 1'. A data part of the IP packet 2' carries reply information.

The VM 3 947 sends the IP packet 2' to the switch 2 945. The switch 2 945 determines that the destination IP address of the IP packet 2' does not belong to the subnet 2 941, and sends the IP packet 2' to the gateway 2 970.

The gateway 2 970 matches the packet processing rule 4' for the IP packet 2', converts the source IP address of the IP packet 2' from 192.168.0.2 to 10.0.0.10, and sends the IP packet 2' to the router 2 934.

The router 2 934 matches the routing rule 5' for the IP packet 2', and forwards the IP packet 2' to the router 3 954 of the VPC 3 950.

The router 3 954 receives the IP packet 2', matches the routing rule 4' for the IP packet 2', and forwards the IP packet 2' to the router 1 934 of a VPC 1 930.

The router 1 934 receives the IP packet 2', matches the routing rule 2' for the IP packet 2', and forwards the IP packet 2' to the gateway 1 960.

The gateway 1 960 receives the IP packet 2', matches the packet processing rule 2' for the IP packet 2', converts the destination IP address of the IP packet 2' from 10.0.0.9 to 192.168.0.2, and sends the IP packet 2' to the switch 1 935. The switch 1 935 sends the IP packet 2 to the VM 1 932.

The VM 1 932 obtains the reply information carried in the IP packet2'. For the VM 1 932, the IP packet 6 is from 10.0.0.10, and the IP packet 6 is the reply packet of the IP packet 1'.

In conclusion, in this embodiment, although the VM 1 932 and a VM 2 934 have the same private network address, the VM 1 932 and the VM 2 934 can access each other through bridging of the VPC 3 950.

Figure 10:
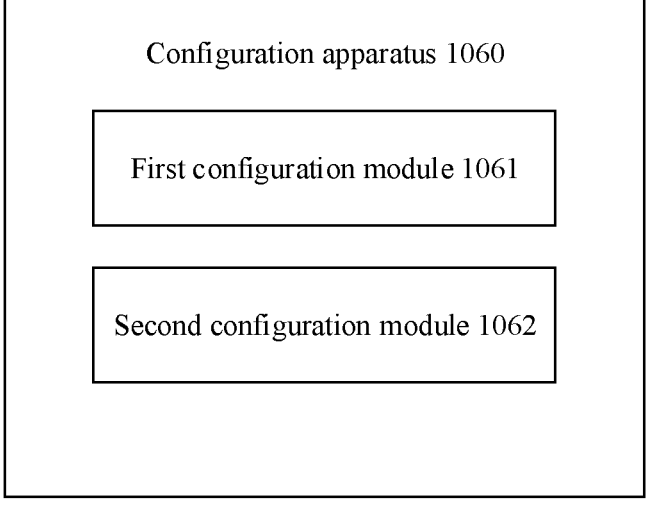
FIG. 10 is a diagram of a configuration apparatus according to an embodiment of the present disclosure.

Further, referring to FIG. 10, FIG. 10 is a diagram of a configuration apparatus 1060 according to an embodiment of the present disclosure. As shown in FIG. 10, a configuration apparatus 1060 includes a first configuration module 1061 and a second configuration module 1062. The first configuration module 1061 is configured to perform an action of creating a gateway in the foregoing embodiment, and the second configuration module 1062 is configured to perform an action of setting rules for the gateways and routers in the foregoing embodiment.

The configuration apparatus 1060 may be disposed on a control platform 6.

Figure 11:
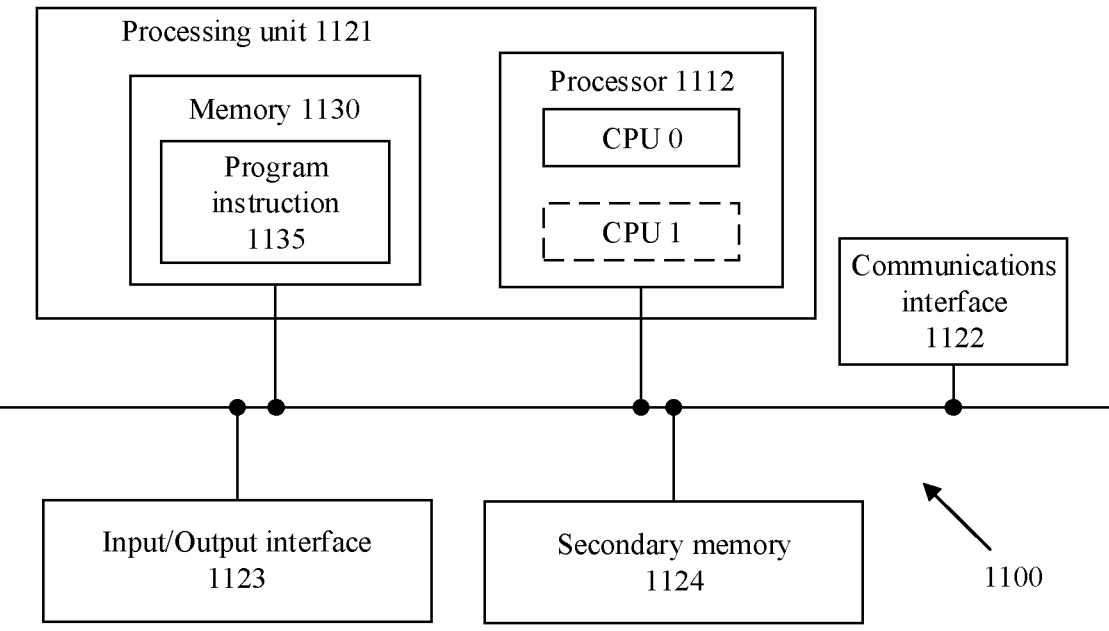
FIG. 11 is a diagram of a computing device according to an embodiment of the present disclosure.

Referring to FIG. 11, FIG. 11 is a diagram of a computing device 1100 according to an embodiment of the present disclosure. As shown in FIG. 11, the computing device 1100 may include a processing unit 1121 and a communications interface 1122. The processing unit 1121 is configured to implement functions defined by an operating system running on a physical server and various software programs, for example, to implement a function of the control platform 6. The communications interface 1122 is configured to communicate and interact with another computing node. Another device may be another physical server. The communications interface 1122 may be a network adapter. Optionally, the physical server may further include an input/output interface 1123. The input/output interface 1123 is connected to an input/output device, to receive input information and output an operation result. The input/output interface 1123 may be a mouse, a keyboard, a display, a CD-ROM drive, or the like. Optionally, the physical server may further include a secondary memory 1124. The secondary memory 1124 is generally referred to as an external memory. A storage medium of the secondary memory 1124 may be a magnetic medium (for example, a floppy disk, a hard disk, or a magnetic tape), an optical medium (for example, an optical disc), a semiconductor medium (for example, a solid-state drive), or the like. The processing unit 1121 may have a plurality of implementation forms. For example, the processing unit 1121 may include a processor 1112 and a memory 1130. The processor 1112 performs related operations of the control platform 6 in the foregoing embodiments based on a program instruction stored in the memory 1130. The processor 1112 may be a central processing unit (CPU) or a graphics processing unit (GPU). The processor 1112 may be a single-core processor or a multi-core processor. The processing unit 1121 may alternatively be independently implemented by using a logic device with built-in processing logic, for example, a field programmable gate array (FPGA) or a digital signal processor (DSP).

It may be clearly understood by a person skilled in the art that, for a convenient and brief description, for a detailed working process of the foregoing system, apparatus, and unit, refer to a corresponding process in the foregoing method embodiments, and details are not described herein again.

Further, in another embodiment of the present disclosure, a container may alternatively be used to replace a virtual machine. This is not limited in this embodiment of the present disclosure.

An embodiment of the present disclosure further provides a computer program product for implementing a function of the foregoing control platform. The computer program product includes a computer-readable storage medium that stores program code, and an instruction included in the program code is used to perform the method procedure described in any one of the foregoing method embodiments. A person of ordinary skill in the art may understand that the foregoing storage medium may include any non-transitory machine-readable medium capable of storing program code, such as a USB flash drive, a removable hard disk, a magnetic disk, an optical disc, a random access memory (RAM), a solid-state disk (SSD), or a non-volatile memory.

It should be noted that any apparatus embodiment described above is merely an example. The units described as separate parts may or may not be physically separate, and parts displayed as units may or may not be physical units, that is, may be located in one place, or may be distributed onto a plurality of network units. Some or all of the processes may be selected based on an actual requirement to achieve an objective of solutions of the embodiments. In addition, in the accompanying drawings of the apparatus embodiments provided by the present disclosure, connection relationships between processes indicate that there are communication connections between the processes, which may be implemented as one or more communications buses or signal cables. A person of ordinary skill in the art may understand and implement the embodiments of the present disclosure without creative efforts.

Based on the description of the foregoing implementations, a person skilled in the art may clearly understand that the present disclosure may be implemented by software in addition to necessary universal hardware, or by dedicated hardware, including a dedicated integrated circuit, a dedicated CPU, a dedicated memory, a dedicated component, and the like. Generally, any function that can be implemented by a computer program can be easily implemented by corresponding hardware. Moreover, a hardware structure used to implement a same function may be in various forms, for example, in a form of an analog circuit, a digital circuit, a dedicated circuit, or the like. However, for the present disclosure, software program implementation is a better implementation in most cases. Based on such an understanding, technical solutions of the present disclosure essentially or the part contributing to the conventional technology may be implemented in a form of a software product. The software product is stored in a readable storage medium, such as a floppy disk of a computer, a USB flash drive, a removable hard disk, a read-only memory (ROM), a random access memory (RAM), a magnetic disk, or an optical disc, and includes several instructions for instructing a computer device (which may be a personal computer, a host, a network device, and the like) to perform the methods described in the embodiments of the present disclosure.

It may be clearly understood by a person skilled in the art that, for the detailed working process of the foregoing system, apparatus, and unit, refer to the corresponding process in the foregoing method embodiments, and details are not described herein again.

The foregoing descriptions are merely implementations of the present disclosure, but are not intended to limit the protection scope of the present disclosure. Any variation or replacement readily figured out by the person skilled in the art within the technical scope disclosed in the present disclosure shall fall within the protection scope of the present disclosure. Therefore, the protection scope of the present disclosure shall be subject to the protection scope of the claims.

What is claimed is:

1. A method for configuring virtual private cloud (VPC) communication between a first VPC and a second VPC, the first VPC and the second VPC communicating using a third VPC and the first VPC and the second VPC having a same private network address segment, the method comprising:

binding, by a control platform of a cloud data center, a first VPC private network address in the first VPC with a first address, the first address belonging to a third VPC private network address segment of the third VPC;

binding, by the control platform, a second VPC private network address in the second VPC with a second address, the second address belonging to the third VPC private network address segment of the third VPC, the first address being different from the second address;

configuring, by the control platform, a first gateway on the first VPC and configuring a second gateway on the second VPC, a private network address of the first gateway being configured as the first address and a private network address of the second gateway being configured as the second address;

configuring, by the control platform, a packet source address of a packet to be the first address, the packet being sent by the first VPC and destined for the second VPC, using the first address; and configuring, by the control platform, a packet destination address of the packet to be the second address, the third VPC private network address segment of the third VPC being different from the private network address segment of the first VPC and the second VPC.

2. The method according to claim 1, further comprising configuring, by the control platform, a routing rule on the third VPC, the routing rule on the third VPC comprising:

forwarding a first packet to the first VPC, a destination address in the packet being the first address; and forwarding a second packet to the second VPC, a second packet destination address being the second address.

3. The method according to claim 1, further comprising:

the binding the first VPC private network address in the first VPC with the first address comprising configuring a first packet processing rule on the first gateway, the first packet processing rule comprising:

converting a source address of an outbound packet from the first VPC private network address in the first VPC into the first address; and converting a destination address of an inbound packet from the first address into the first VPC private network address in the first VPC; and the binding the second VPC private network address in the second VPC with the second address comprising configuring a second packet processing rule on the second gateway, the second packet processing rule comprising:

converting a source address of an outbound packet from the second VPC private network address in the second VPC into the second address; and converting a destination address of an inbound packet from the second address into the second VPC private network address in the second VPC.

4. The method according to claim 3, further comprising:

configuring, by the control platform, a first VPC routing rule on a router of the first VPC, the first VPC routing rule comprising:

forwarding a third packet with a destination address of the second address to the first gateway; and forwarding a fourth packet with a destination address being an address in the first VPC to a subnet of the first VPC; and configuring, by the control platform, a second VPC routing rule on a router of the second VPC, the second VPC routing rule comprising:

forwarding a third packet with a destination address being the first address to the second gateway; and forwarding a fourth packet with a destination address being an address in the second VPC to the subnet of the first VPC.

5. A control platform of a cloud data center of a virtual private cloud (VPC) communications system, the control platform comprising:

a memory storing instructions; and at least one processor in communication with the memory, the at least one processor configured, upon execution of the instructions, to perform the following steps:

generating a first virtual private cloud (VPC) on a public cloud;

generating a second VPC; and generating a third VPC, the first VPC and the second VPC communicating using the third VPC and the first VPC and the second VPC having a same private network address segment, and a third VPC private network address segment of the third VPC being different from a first VPC private network address segment of the first VPC and a second VPC private network address segment of the second VPC;

configuring a first gateway on the first VPC and configuring a second gateway on the second VPC, a private network address of the first gateway being configured as the first address and a private network address of the second gateway being configured as the second address;

the first VPC being configured to send a packet, a source address of the packet comprising a first address, a destination address of the packet comprising a second address, the first address and the second address belong to the third VPC private network address segment of the third VPC, the first VPC private network address in the first VPC is bound with the first address, and the second VPC private network address in the second VPC is bound with the second address; and the third VPC being configured to:

receive the packet; and forward the packet to the second VPC according to a third VPC routing rule of the third VPC, the third VPC routing rule comprises forwarding the packet to the second VPC when a packet destination address comprises the second address.

6. The control platform according to claim 5, wherein the routing rule further comprises forwarding the packet to the first VPC when the packet destination address comprises the first address;

the second VPC is further configured to send a response packet, a response packet source address of the response packet comprises the second address, and a response packet destination address of the response packet comprises the first address; and the third VPC is further configured to receive the response packet and forward the response packet to the first VPC according to the routing rule.

7. A control platform of a cloud data center for configuring virtual private cloud (VPC) communication, the control platform comprising:

a memory storing instructions; and at least one processor in communication with the memory, the at least one processor configured, upon execution of the instructions, to perform the following steps:

bind a first VPC private network address in the first VPC with a first address, the first address belonging to a third VPC private network address segment of a third VPC;

bind a second VPC private network address in the second VPC with a second address, the second address belonging to the third VPC private network address segment of the third VPC, and the first address is different from the second address; and configuring a first gateway on the first VPC and configuring a second gateway on the second VPC, a private network address of the first gateway being configured as the first address and a private network address of the second gateway being configured as the second address;

configure a packet source address of a packet as being the first address, the packet being sent by the first VPC to the second VPC as the first address, and configuring a packet destination address of the packet as being the first VPC and the second VPC communicating using the third VPC, the third VPC private network address segment of the third VPC being different from the private network address segment of the first VPC and the second VPC.

8. The control platform according to claim 7, the at least one processor further executes the instructions to configure a routing rule on the third VPC, the routing rule on the third VPC comprising:

forwarding a packet whose destination address is the first address to the first VPC; and forwarding a packet whose destination address is the second address to the second VPC.

9. The control platform according to claim 7, the at least one processor further executes the instructions to:

configure a first packet processing rule on the first gateway, wherein the first packet processing rule comprises:

converting a source address of an outbound packet from the address in the first VPC into the first address; and converting a destination address of an inbound packet from the first address into the address in the first VPC; and configure a second packet processing rule on the second gateway, wherein the second packet processing rule comprises:

converting a source address of an outbound packet from the address in the second VPC into the second address; and converting a destination address of an inbound packet from the second address into the address in the second VPC.

10. The control platform according to claim 9, the at least one processor further executes the instructions to:

configure a routing rule on a router of the first VPC, wherein the routing rule on the router of the first VPC comprises:

forwarding the packet whose destination address is the second address to the first gateway; and forwarding a packet whose destination address is an address in the first VPC to a subnet of the first VPC; and configure a routing rule on a router of the second VPC, wherein the routing rule on the router of the second VPC comprises:

forwarding the packet whose destination address is the first address to the second gateway; and forwarding a packet whose destination address is an address in the second VPC to the subnet of the first VPC.

* * * * *